US012590903B2

(12) United States Patent
Yano et al.

(10) Patent No.: US 12,590,903 B2
(45) Date of Patent: Mar. 31, 2026

(54) INSPECTION DEVICE AND INSPECTION METHOD WITH INFRARED LIGHT FOR SCRATCH DETECTION ON INSPECTION TARGET

(71) Applicant: MITSUBISHI HEAVY INDUSTRIES, LTD., Tokyo (JP)

(72) Inventors: Yuki Yano, Tokyo (JP); Nobuyuki Kamihara, Tokyo (JP); Takayuki Moritake, Tokyo (JP); Kohei Kawazoe, Tokyo (JP); Kiwamu Nakajima, Tokyo (JP); Toshinobu Muraki, Tokyo (JP); Yusuke Hashida, Tokyo (JP); Kanata Fujii, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 258 days.

(21) Appl. No.: 18/272,722

(22) PCT Filed: Jan. 31, 2022

(86) PCT No.: PCT/JP2022/003703
§ 371 (c)(1),
(2) Date: Jul. 17, 2023

(87) PCT Pub. No.: WO2022/163859
PCT Pub. Date: Aug. 4, 2022

(65) Prior Publication Data
US 2025/0076209 A1     Mar. 6, 2025

(30) Foreign Application Priority Data
Feb. 1, 2021     (JP) ................................. 2021-014232

(51) Int. Cl.
*G01N 21/88* (2006.01)
*G01N 21/84* (2006.01)
*G01N 21/958* (2006.01)

(52) U.S. Cl.
CPC ..... *G01N 21/8851* (2013.01); *G01N 21/8422* (2013.01); *G01N 21/8806* (2013.01);
(Continued)

(58) Field of Classification Search
CPC ........... G01N 21/8851; G01N 21/8422; G01N 21/8806; G01N 21/958; G01N 2021/8427; G01N 2021/8848; G01N 21/3563
See application file for complete search history.

(56) References Cited

U.S. PATENT DOCUMENTS 5,534,698 A * 7/1996 Ohshima ................ G01N 21/55
250/341.4
6,310,348 B1 * 10/2001 Melling ............. G01N 21/8422
356/244
(Continued)

FOREIGN PATENT DOCUMENTS

CN          205506713          8/2016
CN          106383127          2/2017
(Continued)

OTHER PUBLICATIONS

English translation of Japanese Office Action issued May 7, 2024 in corresponding Japan Patent Application No. 2022-578539.
(Continued)

*Primary Examiner* — Seung C Sohn
(74) *Attorney, Agent, or Firm* — Wenderoth, Lind & Ponack, L.L.P.

(57) ABSTRACT
An inspection device includes an infrared acquisition unit for acquiring infrared light detected by an infrared camera
(Continued)

for detecting infrared light from an inspection target that includes an electroconductive member, an intensity-determining unit for determining a detection intensity of the infrared light, and a scratch-determining unit for determining whether or not there is a scratch on the electroconductive member based on the detection intensity of the infrared light.

24 Claims, 19 Drawing Sheets

(52) U.S. Cl.
CPC ... *G01N 21/958* (2013.01); *G01N 2021/8427* (2013.01); *G01N 2021/8848* (2013.01)

(56) References Cited

U.S. PATENT DOCUMENTS

| | | | |
|---|---|---|---|
| 6,476,393 | B1 | 11/2002 | Yoshida et al. |
| 2010/0124600 | A1 | 5/2010 | Basol et al. |
| 2017/0186148 | A1 | 6/2017 | Uemura |

FOREIGN PATENT DOCUMENTS

| | | |
|---|---|---|
| JP | 1-113641 | 5/1989 |
| JP | 5-6928 | 1/1993 |
| JP | 5-209784 | 8/1993 |
| JP | 6 -229933 | 8/1994 |
| JP | 9-273997 | 10/1997 |
| JP | 10-185830 | 7/1998 |
| JP | 11-183397 | 7/1999 |
| JP | 11-191373 | 7/1999 |
| JP | 2000-55815 | 2/2000 |
| JP | 2000-260800 | 9/2000 |
| JP | 2000-314707 | 11/2000 |
| JP | 2004-20336 | 1/2004 |
| JP | 2006-349647 | 12/2006 |
| JP | 2008-085581 | 4/2008 |
| JP | 2012-185669 | 9/2012 |
| JP | 2014-2025 | 1/2014 |
| JP | 2015-81826 | 4/2015 |
| JP | 2016-4020 | 1/2016 |
| JP | 2017-120232 | 7/2017 |
| JP | 2018-9987 | 1/2018 |
| KR | 10-0966544 | 6/2010 |

OTHER PUBLICATIONS

Extended European Search Report issued Jun. 26, 2024 in European Patent Application No. 22746078.9.

International Search Report issued Apr. 5, 2022 in corresponding International (PCT) Application No. PCT/J P2022/003703, with English translation.

Written Opinion issued Apr. 5, 2022 in corresponding International (PCT) Application No. PCT/J P2022/003703, with translation.

Notice of Reasons for Refusal mailed Dec. 2, 2025 in Japanese Patent Application No. 2022-578539, with English Translation.

* cited by examiner

Figures 3, 4:
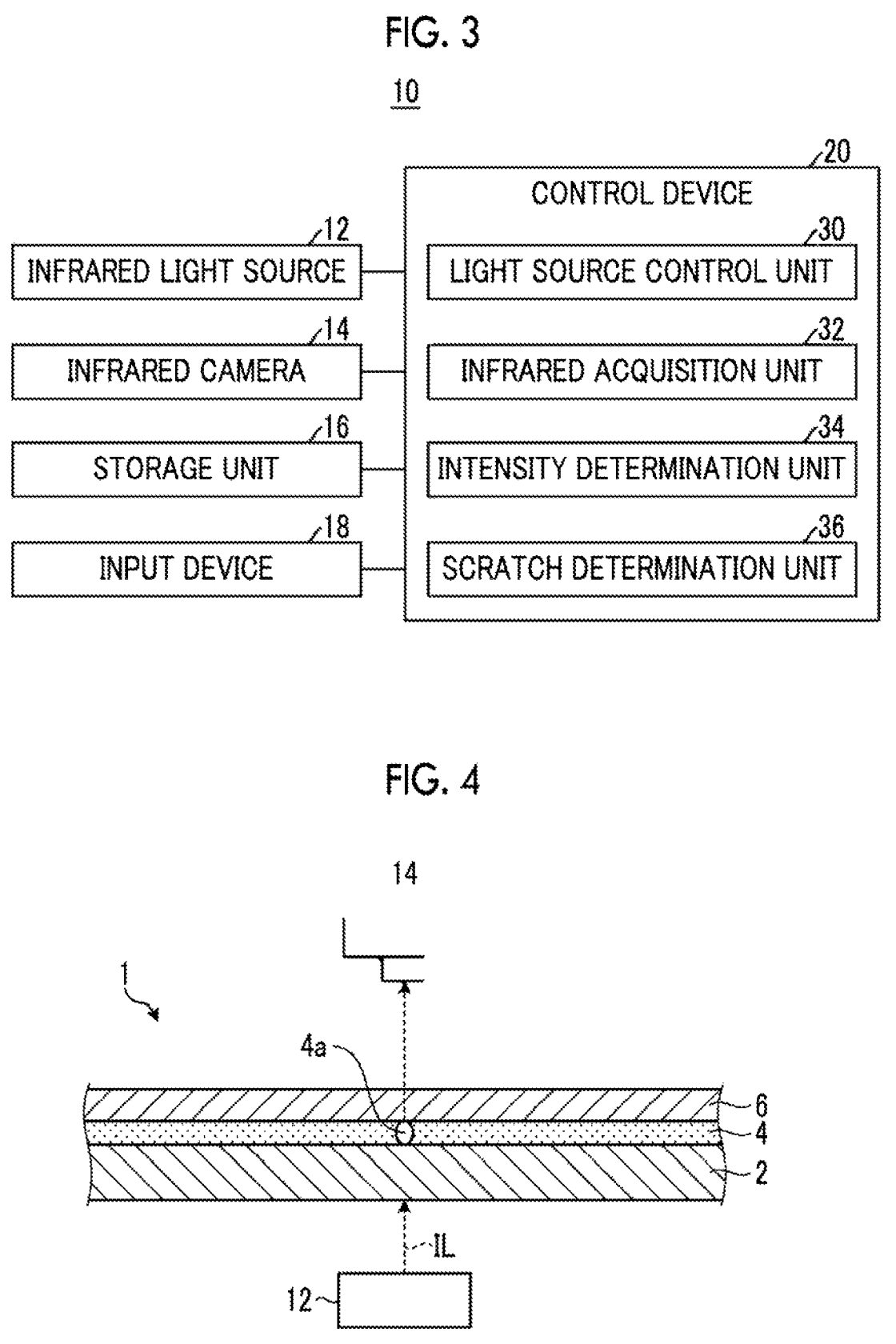

CONTROL DEVICE                                    20

| INFRARED LIGHT SOURCE | 12 | LIGHT SOURCE CONTROL UNIT | 30 |
| INFRARED CAMERA | 14 | INFRARED ACQUISITION UNIT | 32 |
| STORAGE UNIT | 16 | INTENSITY DETERMINATION UNIT | 34 |
| INPUT DEVICE | 18 | SCRATCH DETERMINATION UNIT | 36 |

| SCRATCH STATE | INSPECTION INTENSITY |
|---|---|
| S1 | A1 |
| S2 | A2 |
| ... | ... |
| Sn | An |

START

S10
EMIT INFRARED LIGHT FOR IRRADIATION

S12
ACQUIRE INFRARED LIGHT

S14
DETERMINE INTENSITY OF INFRARED LIGHT

S16
COMPARE DETERMINED INTENSITY WITH REFERENCE TABLE

S18
DETERMINE DEGREE OF SCRATCH

END

10A

START

S40
HEAT BASE MATERIAL

S42
ACQUIRE INFRARED LIGHT

S44
HAS INFRARED LIGHT BEEN DETECTED?          No

Yes  S46
DETERMINE THAT THERE IS SCRATCH

S48
DETERMINE THAT THERE IS NO SCRATCH

END

START

IRRADIATE MIRROR WITH INFRARED LIGHT ⟋S70

ACQUIRE INFRARED LIGHT ⟋S72

DETERMINE INTENSITY OF INFRARED LIGHT ⟋S74

COMPARE DETERMINED INTENSITY WITH REFERENCE TABLE ⟋S76

DETERMINE DEGREE OF SCRATCH ⟋S78

END

FIG. 17

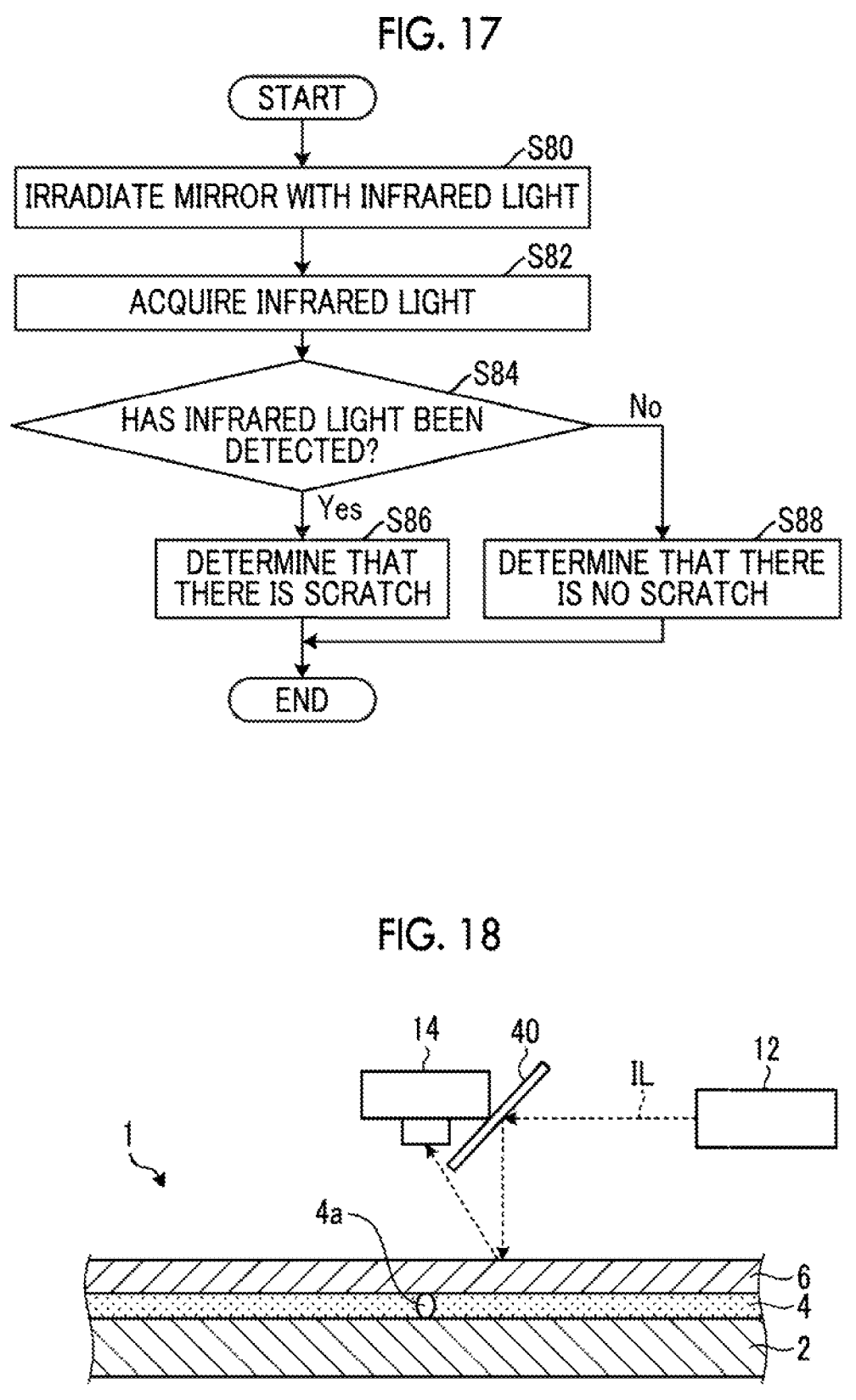

START

IRRADIATE MIRROR WITH INFRARED LIGHT ~S80

ACQUIRE INFRARED LIGHT ~S82

HAS INFRARED LIGHT BEEN DETECTED? ~S84

No

Yes ~S86

DETERMINE THAT THERE IS SCRATCH ~S86

DETERMINE THAT THERE IS NO SCRATCH ~S88

END

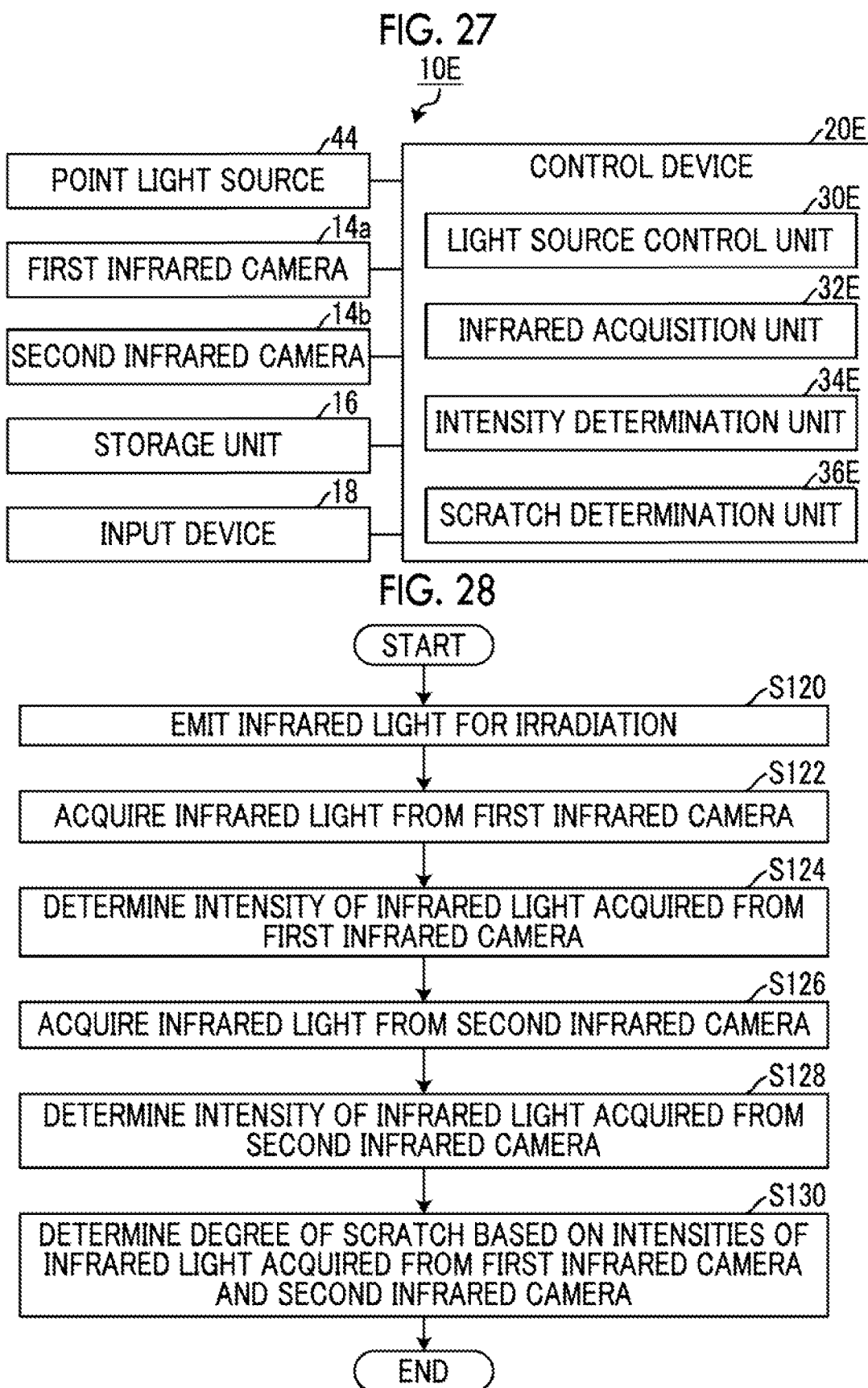

44
POINT LIGHT SOURCE

20E
CONTROL DEVICE

30E
LIGHT SOURCE CONTROL UNIT

14a
FIRST INFRARED CAMERA

32E
INFRARED ACQUISITION UNIT

14b
SECOND INFRARED CAMERA

34E
INTENSITY DETERMINATION UNIT

16
STORAGE UNIT

36E
SCRATCH DETERMINATION UNIT

18
INPUT DEVICE

FIG. 28

START

S120
EMIT INFRARED LIGHT FOR IRRADIATION

S122
ACQUIRE INFRARED LIGHT FROM FIRST INFRARED CAMERA

S124
DETERMINE INTENSITY OF INFRARED LIGHT ACQUIRED FROM FIRST INFRARED CAMERA

S126
ACQUIRE INFRARED LIGHT FROM SECOND INFRARED CAMERA

S128
DETERMINE INTENSITY OF INFRARED LIGHT ACQUIRED FROM SECOND INFRARED CAMERA

S130
DETERMINE DEGREE OF SCRATCH BASED ON INTENSITIES OF INFRARED LIGHT ACQUIRED FROM FIRST INFRARED CAMERA AND SECOND INFRARED CAMERA

END

INSPECTION DEVICE AND INSPECTION METHOD WITH INFRARED LIGHT FOR SCRATCH DETECTION ON INSPECTION TARGET

TECHNICAL FIELD

The present disclosure relates to an inspection device and an inspection method.

BACKGROUND ART

A technique of inspecting a transparent conductive film applied to a cathode ray tube is known (for example, refer to Japanese Unexamined Patent Application Publication No. H11-191373).

SUMMARY OF INVENTION

Technical Problem

A conductive film and a top coat are applied to cabin windows of an aircraft and the like. When a very small scratch is generated on a cabin window, it is necessary to determine whether only the top coat needs to be repaired or the conductive film inside also needs to be repaired. There is a demand for a technique of being able to determine the degree of a scratch when a very small scratch is generated on a cabin window.

An object of the present disclosure is to provide an inspection device and an inspection method capable of easily determining the presence or absence of a scratch on a conductive film.

Solution to Problem

An inspection device according to one aspect of the present disclosure includes: an infrared acquisition unit that acquires infrared light detected by an infrared camera that detects the infrared light from an inspection target including a member; conductive an intensity determination unit that determines a detection intensity of the infrared light; and a scratch determination unit that determines a presence or absence of a scratch on the conductive member based on the detection intensity of the infrared light.

An inspection method according to one aspect of the present disclosure includes: a step of acquiring infrared light detected by an infrared camera that detects the infrared light n inspection target including a conductive member; a step of determining a detection intensity of the infrared light; and a step of determining a presence or absence of a scratch on the conductive member based on the detection intensity of the infrared light.

Advantageous Effects of Invention

According to the present disclosure, it is possible to easily determine the presence or absence of a scratch on the conductive member.

BRIEF DESCRIPTION OF DRAWINGS

FIG. 3 is a block diagram showing a configuration example of an inspection device according to the first embodiment.

FIG. 4 is a diagram for describing a method for disposing an infrared light source and an infrared camera.

FIG. 17 is a flowchart showing one example of a processing flow of an inspection device according to a modification example of the fourth embodiment.

FIG. 18 is a diagram for describing a method for disposing an infrared light source and an infrared camera according to a fifth embodiment.

FIG. 24 is a cross-sectional view of an inspection device according to a modification example of the sixth embodiment.

FIG. 27 is a block diagram showing a configuration example of the inspection device according to the eighth embodiment.

FIG. 28 is a flowchart showing one example of a processing flow of the inspection device according to the eighth embodiment.

DESCRIPTION OF EMBODIMENTS

Hereinafter, embodiments according to the present invention will be described in detail with reference to the accompanying drawings. However, the present invention is not limited by the embodiments, and in the case of a plurality of embodiments, the present invention also includes those configured in combination of the embodiments. In addition, in the following embodiments, the same parts are denoted by the same reference signs, and the duplicate descriptions will be omitted.

First Embodiment

Figure 1:
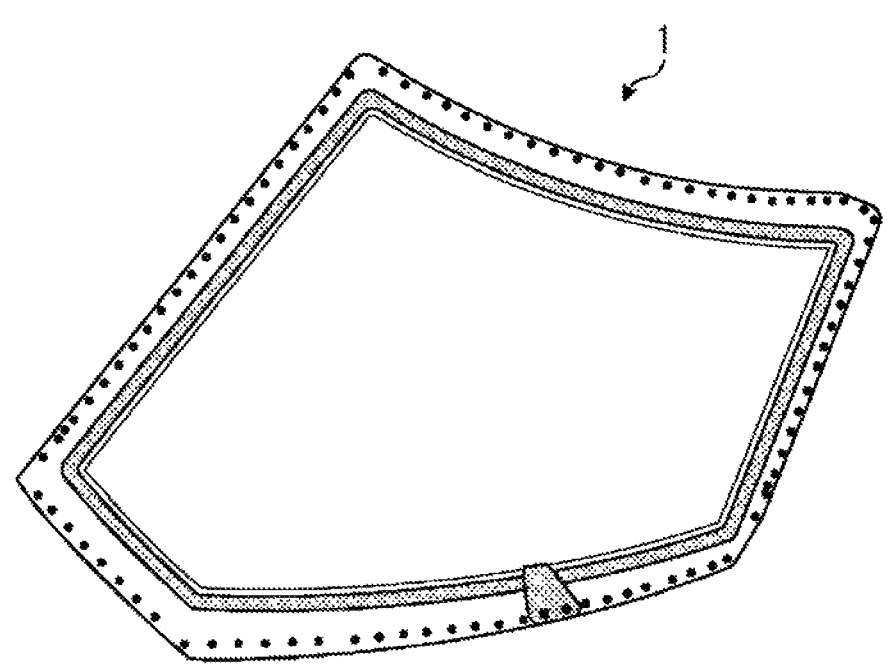
FIG. 1 is a diagram for describing an inspection target according to a first embodiment.
Figure 2:
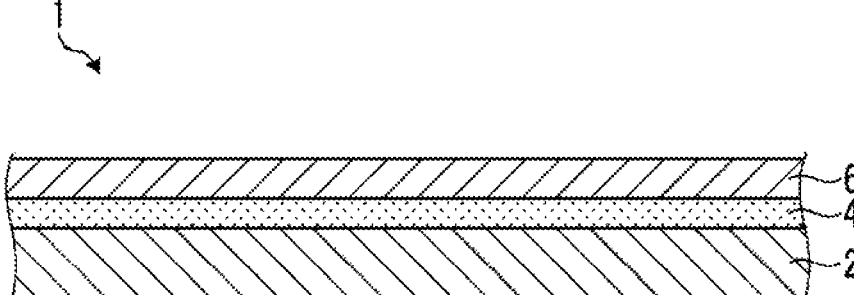
FIG. 2 is a diagram schematically showing a cross section of the inspection target according to the first embodiment.

An inspection target according to a first embodiment will be described with reference to FIGS. 1 and 2. FIG. 1 is a diagram for describing the inspection target according to the first embodiment. FIG. 2 is a diagram schematically showing a cross section of the inspection target according to the first embodiment.

As shown in FIG. 1, an inspection target 1 in the present embodiment is a cabin window of an aircraft. As shown in FIG. 2, the inspection target 1 includes a base material 2, a conductive film 4, and a top coat 6. The inspection target 1 has a structure in which the conductive film 4 is laminated on an upper surface of the base material 2. The inspection target 1 has a structure in which the top coat is laminated on an upper surface of the conductive film 4.

The base material 2 is made of, for example, polyester-based resin, polycarbonate-based resin, or the like. The conductive film 4 is made of, for example, indium tin oxide (ITO). The top coat 6 is made of, for example, urethane-based resin, acrylic-based resin, silicone-based resin, or the like as a hard code. The top coat 6 is made of, for example, polyethylene terephthalate (PET) as a protective film. The base material 2, the conductive film 4, and the top coat 6 are not limited to being made of these materials, and may be made of other materials.

In the case of the configuration shown in FIG. 2, even when a scratch is generated on only the top coat 6, the generation location of the scratch becomes blurred, so that it is difficult to visually determine whether or not the scratch extends to the conductive film 4. In the present embodiment, a determination on a scratch generated on the conductive film 4 of the inspection target 1 having the configuration shown in FIG. 2 is made.

[Inspection Device]

A configuration example of an inspection device according to the first embodiment will be described with reference to FIG. 3. FIG. 3 is a block diagram showing a configuration example of the inspection device according to the first embodiment.

As shown in FIG. 3, an inspection device 10 includes an infrared light source 12, an infrared camera 14, a storage unit 16, an input device 18, and a control device 20. Hereinafter, the infrared light source 12 and the infrared camera 14 will be described as being configured as an integrated system; however, the present disclosure is not limited thereto. The infrared light source 12 and the infrared camera 14 may be configured as separate systems.

The infrared light source 12 emits infrared light. The infrared light source 12 is disposed at a position where the infrared light source 12 can irradiate the inspection target 1 with the infrared light. The infrared camera 14 is an infrared ray camera. The infrared camera 14 is disposed at a position where the infrared camera 14 can capture an image of the inspection target 1.

A method for disposing the infrared light source 12 and the infrared camera 14 will be described with reference to FIG. 4. FIG. 4 is a diagram for describing the method for disposing the infrared light source 12 and the infrared camera 14.

As shown in FIG. 4, the infrared light source 12 and the infrared camera 14 are disposed to face each other with the inspection target 1 interposed therebetween. For example, the infrared light source 12 is disposed to face the base material 2. For example, the infrared camera 14 is disposed to face the top coat 6.

The infrared light source 12 emits infrared light IL to the base material 2. The infrared light source 12 emits the infrared light IL of a wavelength that transmits through the base material 2 and the top coat 6 but does not transmit through the conductive film 4. It is desirable that the wavelength is, for example, approximately 1 μm to 5 μm; however, the wavelength is not limited thereto. For example, when the top coat 6 contains PET and the base material 2 contains polycarbonate resin, the wavelength may be set to approximately 3 μm to 3.8 μm. Namely, the wavelength of the infrared light IL may be set depending on the materials of the base material 2 and the top coat 6. When there is a scratch 4*a* on the conductive film 4, the infrared light IL with which the base material 2 is irradiated transmits through the top coat 6 through the scratch 4*a*. When there is no scratch 4*a* on the conductive film 4, the infrared light IL with which the base material 2 is irradiated is blocked by the conductive film 4 and does not transmit through the top coat 6.

The infrared camera 14 detects the infrared light from the top coat 6. The infrared camera 14 detects the infrared light IL with which the base material 2 is irradiated by the infrared light source 12. When there is the scratch 4*a* on the conductive film 4, the infrared camera 14 detects the infrared light IL with which the base material 2 is irradiated by the infrared light source 12 and which transmits through the base material 2 and the top coat 6. When there is no scratch 4*a* on the conductive film 4, the infrared light IL with which the base material 2 is irradiated by the infrared light source 12 does not transmit through the conductive film 4, so that the infrared camera 14 does not detect the infrared light IL.

The infrared camera 14 may be provided with, for example, a filter (not shown) for increasing the detection sensitivity of the infrared light IL. The filter may be provided, for example, on an incident portion of the infrared light IL in the infrared camera 14. In this case, the infrared camera 14 detects the infrared light IL through the filter. The filter can be a filter that blocks light having a wavelength other than the wavelength of the detection target.

For example, the infrared camera 14 may be surrounded by a light-shading object (not shown) that is located between the inspection target 1 and the infrared camera 14 to surround the infrared camera 14. The light-shading object prevents surrounding ambient light from being incident on the infrared camera 14. Accordingly, in the present embodiment, the detection sensitivity of the infrared light is improved.

Returning to FIG. 3, the storage unit 16 is a memory that stores various information. The storage unit 16 stores, for example, information such as calculation contents of the control device 20 and a program. The storage unit 16 includes, for example, at least one of main storage devices such as a random access memory (RAM) and a read only memory (ROM), an external storage device such as a hard disk drive (HDD), and the like. In the present embodiment, the storage unit 16 stores a reference table for determining the presence or absence of a scratch on the conductive film 4.

Figures 5, 6:
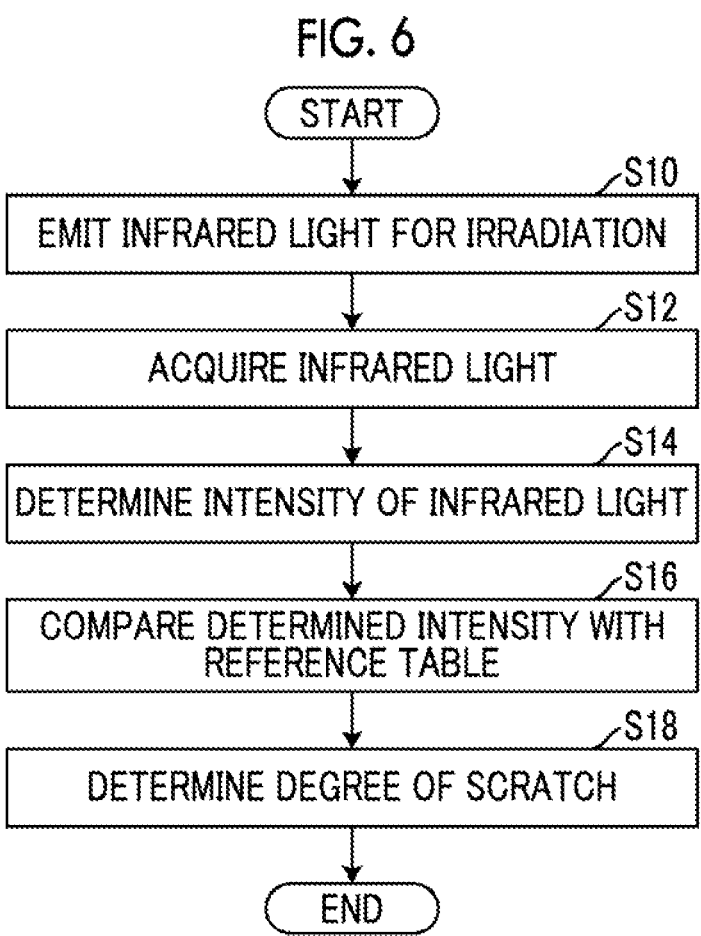
FIG. 5 is a table for describing a reference table according to the first embodiment.
FIG. 6 is a flowchart showing one example of a processing flow of the inspection device according to the first embodiment.

A reference table according to the first embodiment will be described with reference to FIG. 5. FIG. 5 is a table for describing the reference table according to the first embodiment.

FIG. 5 shows a reference table 16a stored in the storage unit 16. The reference table 16a includes items such as a "scratch state" and an "inspection intensity". In FIG. 4, for example, the reference table 16a shows a relationship between the "scratch state" and the "inspection intensity" when the infrared light source 12 irradiates the inspection target with the infrared light IL and the infrared camera 14 detects the infrared light IL that transmits through the inspection target 1.

The "scratch state" indicates the degree of the scratch 4a generated on the conductive film 4. The "scratch state" is stepwise classified into, for example, "S1", "S2", . . . "Sn" (n is an arbitrary integer) according to the degree of the scratch 4a. The degree of the scratch 4a also includes a state of the case of no scratch. In FIG. 5, the "scratch states" are conceptually shown as "S1" to "Sn", but are actually represented by numerical values or the like.

The "inspection intensity" indicates the detection intensity of the infrared light. The "inspection intensity" is stepwise classified into, for example, as "A1", "A2", . . . , "An" (n is an arbitrary integer) according to the degree of the scratch 4a. In FIG. 5, the "inspection intensities" are conceptually shown as "A1" to "An", but are actually represented by numerical values or the like.

In the reference table 16a, the "scratch state" and the "inspection intensity" are associated with each other. The reference table 16a shows, for example, that the "inspection intensity" of the infrared light is "A1" when the "scratch state" is "S1". Namely, in the first embodiment, the degree of the scratch 4a can be determined by referring to the detection intensity of the infrared light by the infrared camera 14.

For example, the reference table 16a may store only a reference value of the detection intensity for determining that there is a scratch. Namely, the reference table 16a may be a table for determining the degree of a scratch or a table for determining the presence or absence of a scratch.

The input device 18 receives various operations from a user. The input device 18 can be realized by various input devices such as a button, a switch, a lever, and a touch panel.

Returning to FIG. 3, the control device 20 controls the operation of each part of the inspection device 10. The control device 20 is realized, for example, by causing a central processing unit (CPU), a micro processing unit (MPU), or the like to execute the program stored in the storage unit 16 or the like, with the RAM or the like as a work region. The control device 20 may be realized by, for example, an integrated circuit such as an application specific integrated circuit (ASIC) or a field programmable gate array (FPGA). The control device 20 may be realized by a combination of hardware and software.

The control device 20 includes a light source control unit 30, an infrared acquisition unit 32, an intensity determination unit 34, and a scratch determination unit 36.

The light source control unit 30 controls the infrared light source 12 to emit the infrared light for irradiation. The light source control unit 30 controls the infrared light source 12 to set a wavelength of the infrared light to be emitted for irradiation.

The infrared acquisition unit 32 controls the infrared camera 14 to detect the infrared light. The infrared acquisition unit 32 acquires the infrared light detected by the infrared camera 14.

The intensity determination unit 34 determines the intensity of the infrared light. For example, the intensity determination unit 34 determines the intensity of the infrared light acquired by the infrared acquisition unit 32 from the infrared camera 14.

The scratch determination unit 36 determines the degree of the scratch 4a on the conductive film 4. For example, the scratch determination unit 36 refers to the degree of the scratch 4a on the conductive film 4 based on the intensity of the infrared light determined by the intensity determination unit 34 and on the reference table 16a.

[Processing Contents]

Processing contents of the inspection device according to the first embodiment will be described with reference to FIG. 6. FIG. 6 is a flowchart showing one example of a processing flow of the inspection device according to the first embodiment.

The control device 20 causes the infrared light to be emitted for irradiation (step S10). Specifically, the light source control unit 30 controls the infrared light source 12 to irradiate the base material 2 with the infrared light. Then, the process proceeds to step S12.

The control device 20 acquires the infrared light (step S12). Specifically, the infrared acquisition unit 32 controls the infrared camera 14 to detect the infrared light that transmits through the inspection target 1, and acquires the detected infrared light. Then, the process proceeds to step S14.

The control device 20 determines the intensity of the infrared light (step S14). Specifically, the intensity determination unit 34 determines the detection intensity of the infrared light acquired in step S12. Then, the process proceeds to step S16.

The control device 20 compares the determined intensity with the reference table (step S16). Specifically, the scratch determination unit 36 compares the determination result in step S14 with the reference table 16a stored in the storage unit 16. Then, the process proceeds to step S18.

The control device 20 determines the degree of the scratch 4a on the conductive film 4 (step S18). Specifically, the scratch determination unit 36 determines the degree of the scratch 4a on the conductive film 4 based on the comparison result in step S16. Then, the processing in FIG. 6 is terminated.

As described above, in the first embodiment, the inspection target 1 is irradiated with the infrared light, and the degree of the scratch 4a on the conductive film 4 is determined based on the detection intensity of the infrared light that transmits through the inspection target 1. Accordingly, in the first embodiment, presence or absence of the scratch 4a on the conductive film 4 and the degree of the scratch 4a can be easily determined.

In the first embodiment, the inspection device 10 may be provided with a distance measurement device that measures a distance between the infrared light source 12 and the inspection target 1 or a distance between the infrared camera 14 and the inspection target 1. In this case, for example, the infrared acquisition unit 32 may change the detection sensitivity of the infrared camera 14 depending on the distance between the inspection target 1 and the infrared camera 14. For example, when the distance between the inspection target 1 and the infrared camera 14 is lengthened, the intensity of the infrared light IL becomes weak, so that the infrared acquisition unit 32 may increase the detection sensitivity of the infrared camera 14.

In addition, in the inspection device 10, instead of the infrared camera 14, a normal camera including a charge coupled device (CCD) element may be used. In this case, an up-converter resin that converts infrared light into visible light may be disposed between the normal case and the inspection target 1. For example, the up-converter resin may be disposed on an upper surface of the top coat 6 between the infrared camera 14 and the inspection target 1.

Processing Contents of Modification Example of First Embodiment

Next, processing contents of a modification example of the first embodiment will be described. Since a configuration of an inspection device according to the modification example of the first embodiment is the same as that of the inspection device 10 shown in FIG. 3, the description will be omitted.

In the first embodiment, the degree of the scratch 4a on the conductive film 4 is determined based on the detection intensity of the infrared light IL; however, the present disclosure is not limited thereto. In the modification example of the first embodiment, when the infrared light IL is detected, it may be determined that there is a scratch, and when the infrared light IL is not detected, it may be determined that there is no scratch.

In the modification example of the first embodiment, the wavelength of the infrared light IL emitted for irradiation by the infrared light source 12 may be set to a value different from that of the first embodiment. In the modification example of the first embodiment, for example, when the top coat 6 contains PET and the base material 2 contains polycarbonate resin, the wavelength may be set to approximately 3.8 μm to 5.0 μm.

Figures 7, 8:
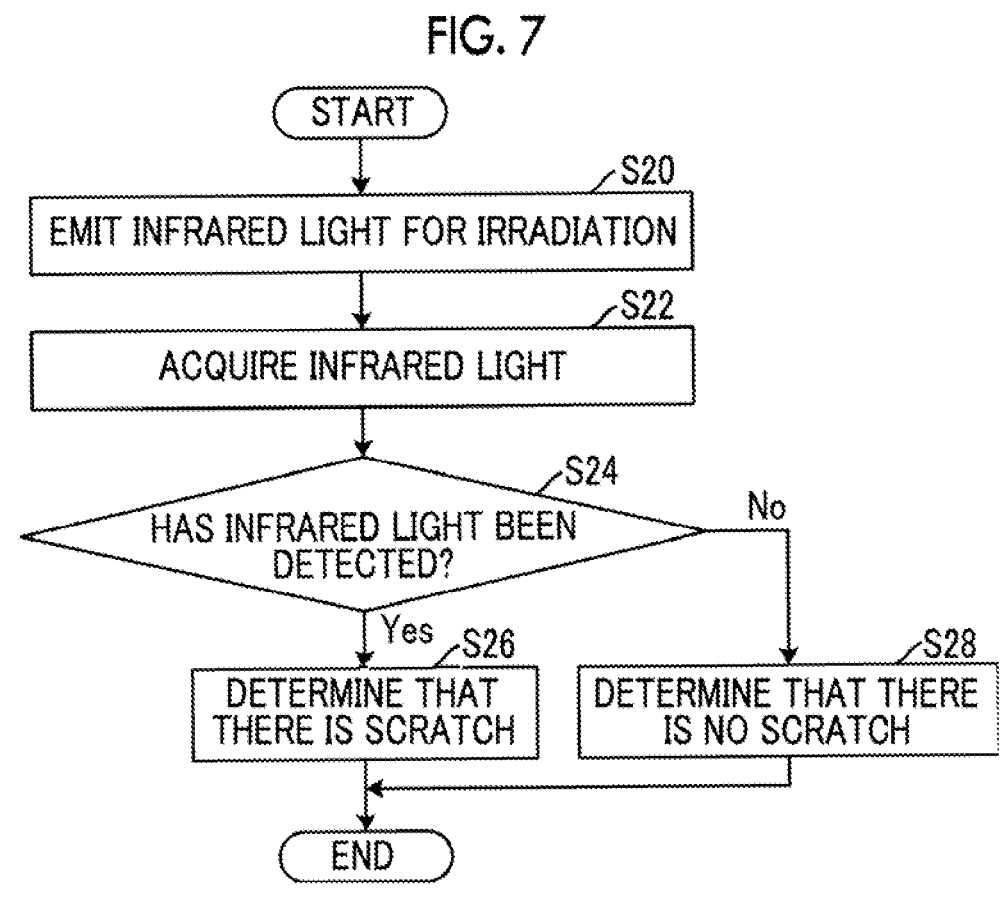
FIG. 7 is a flowchart showing one example of a processing flow of an inspection device according to a modification example of the first embodiment.
FIG. 8 is a block diagram showing a configuration example of an inspection device according to a second embodiment.

The processing contents of the inspection device 10 according to the modification example of the first embodiment will be described with reference to FIG. 7. FIG. 7 is a flowchart showing one example of a processing flow of the inspection device 10 according to the modification example of the first embodiment.

Since the processes of step S20 and step S22 are the same as the processes of step S10 and step S12 shown in FIG. 6, respectively, the descriptions will be omitted.

The control device 20 determines whether or not the infrared light has been detected (step S24). Specifically, the intensity determination unit 34 determines whether or not the infrared camera 14 has detected the infrared light. When it is determined that the infrared light has been detected (step S24: Yes), the process proceeds to step S26. When it is not determined that the infrared light has been detected (step S24: No), the process proceeds to step S28.

When the result in step S24 is determined to be Yes, the control device 20 determines that there is a scratch (step S26). Specifically, the scratch determination unit 36 determines that there is the scratch 4a on the conductive film 4. Then, the processing in FIG. 7 is terminated.

When the result in step S24 is determined to be No, the control device 20 determines that there is no scratch (step S28). Specifically, the scratch determination unit 36 determines that there is no scratch 4a on the conductive film 4. Then, the processing in FIG. 7 is terminated.

As described above, in the modification example of the first embodiment, when the inspection target 1 is irradiated with the infrared light, and the infrared light that transmits the through inspection target can be detected, it is determined that there is the scratch 4a on the conductive film 4, and when the infrared light cannot be detected, it is determined that there is no scratch 4a on the conductive film 4. Accordingly, in the modification example of the first embodiment, the presence or absence of the scratch 4a on the conductive film 4 can be easily determined.

Second Embodiment

A configuration example of an inspection device according to a second embodiment will be described with reference to FIG. 8. FIG. 8 is a block diagram showing a configuration example of the inspection device according to the second embodiment.

As shown in FIG. 8, an inspection device 10A according to the second embodiment is different from the inspection device 10 illustrated in FIG. 3 in that a heating device 22 is provided instead of the infrared light source 12 and a control device 20A includes a heating control unit 38 instead of the light source control unit 30.

The heating device 22 heats the base material 2. For example, the heating device 22 sends warm air to the base material 2 to heat the base material 2. For example, the heating device 22 may heat the base material 2 to approximately 40° C. For example, the heating device 22 may change the heating temperature depending on the heat-resistant temperature of the base material 2. For example, the heating device 22 may heat the base material 2 to approximately 80° C. depending on the heat-resistant temperature of the base material 2. For example, the heating device 22 may heat each partial region of the base material 2.

The heating control unit 38 controls the heating device 22 to heat the base material 2. The heating control unit 38 controls the heating device 22 to set a heating temperature.

Figure 9:
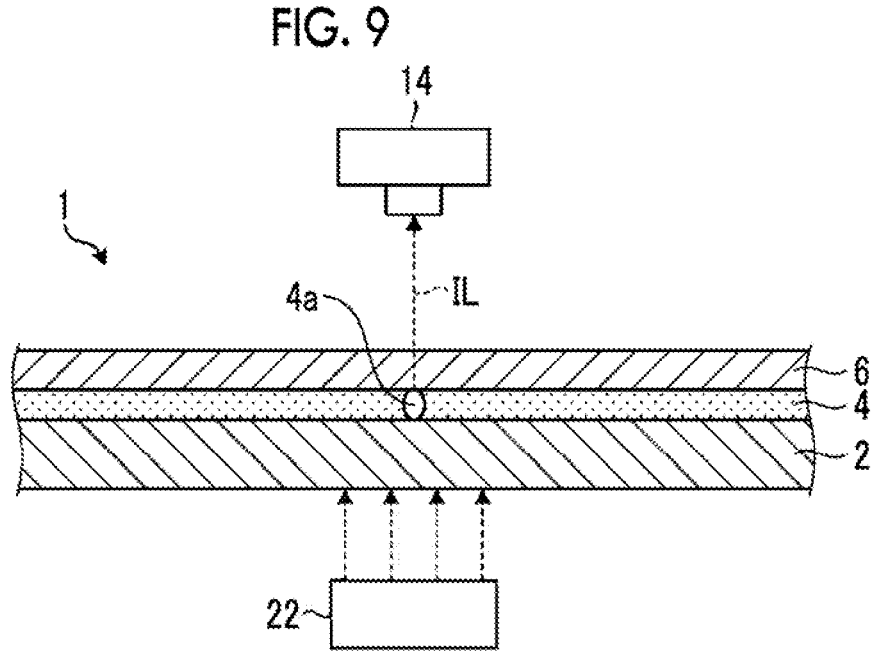
FIG. 9 is a diagram for describing a method for disposing a heating device and an infrared camera.

A method for disposing the heating device 22 and the infrared camera 14 will be described with reference to FIG. 9. FIG. 9 is a diagram for describing the method for disposing the heating device 22 and the infrared camera 14.

As shown in FIG. 9, the heating device 22 and the infrared camera 14 are disposed to face each other with the inspection target 1 interposed therebetween. For example, the heating device 22 is disposed to face the base material 2. For example, the infrared camera 14 is disposed to face the top coat 6.

When the base material 2 is heated by the heating device 22, the base material 2 radiates the infrared light IL in the direction of the infrared camera 14 through blackbody radiation. In this case, when there is the scratch 4a on the conductive film 4, the infrared light IL released through blackbody radiation transmits through the top coat 6 and is detected by the infrared camera 14. When there is no scratch 4a on the conductive film 4, the infrared light IL released through blackbody radiation does not transmit through the conductive film 4, so that the infrared light IL is not detected by the infrared camera 14. Namely, in the second embodiment, the heated base material 2 is used as an infrared light source.

[Processing Contents]

Figure 10:
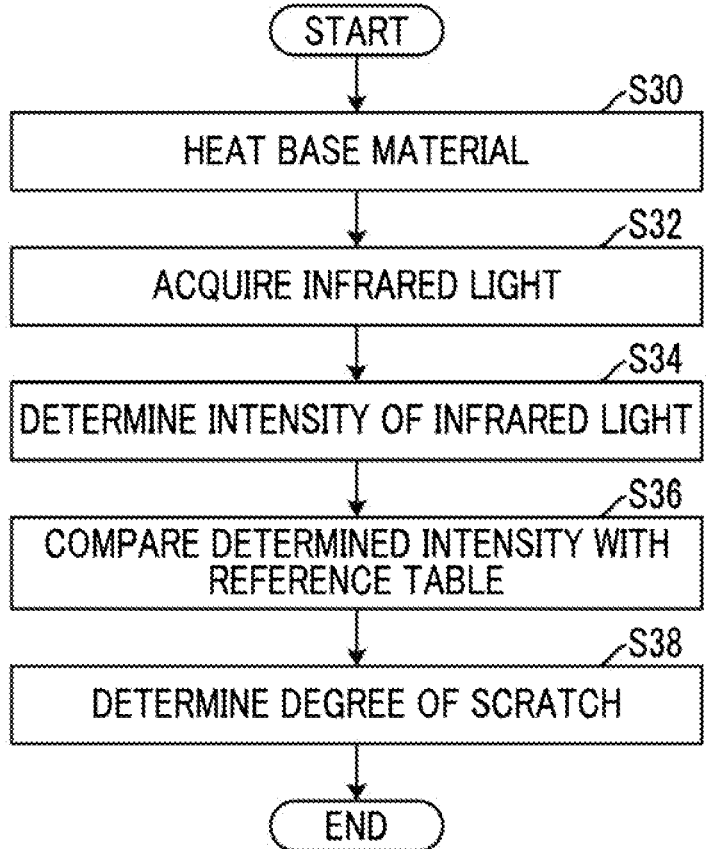
FIG. 10 is a flowchart showing one example of a processing flow of the inspection device according to the second embodiment.

Processing contents of the inspection device according to the second embodiment will be described with reference to FIG. 10. FIG. 10 is a flowchart showing one example of a processing flow of the inspection device according to the second embodiment.

The control device 20A causes the base material 2 to be heated (step S30). Specifically, the heating control unit 38 controls the heating device 22 to heat the base material 2. Then, the process proceeds to step S32.

Since the processes of step S32 to step S38 are the same as the processes of step S12 to step S18 shown in FIG. 6, respectively, the descriptions will be omitted.

In the second embodiment, the storage unit 16 stores a reference table corresponding to the example shown in FIG. 9.

As described above, in the second embodiment, the degree of the scratch 4a on the conductive film 4 is determined based on the detection intensity of the infrared light through blackbody radiation, which transmits through the inspection target. Accordingly, in the second embodiment, the presence or absence of the scratch 4a on the conductive film 4 and the degree of the scratch 4a can be easily determined.

Processing Contents of Modification Example of Second Embodiment

Next, processing contents of a modification example of the second embodiment will be described. Since a configuration of an inspection device according to the modification example of the second embodiment is the same as that of the inspection device 10A shown in FIG. 8, the description will be omitted.

In the second embodiment, the degree of the scratch 4a on the conductive film 4 is determined based on the detection intensity of the infrared light IL caused by the blackbody radiation; however, the present disclosure is not limited thereto. In the modification example of the second embodiment, when the infrared light IL through blackbody radiation is detected, it may be determined that there is a scratch, and when the infrared light IL is not detected, it may be determined that there is no scratch.

Figures 11, 12:
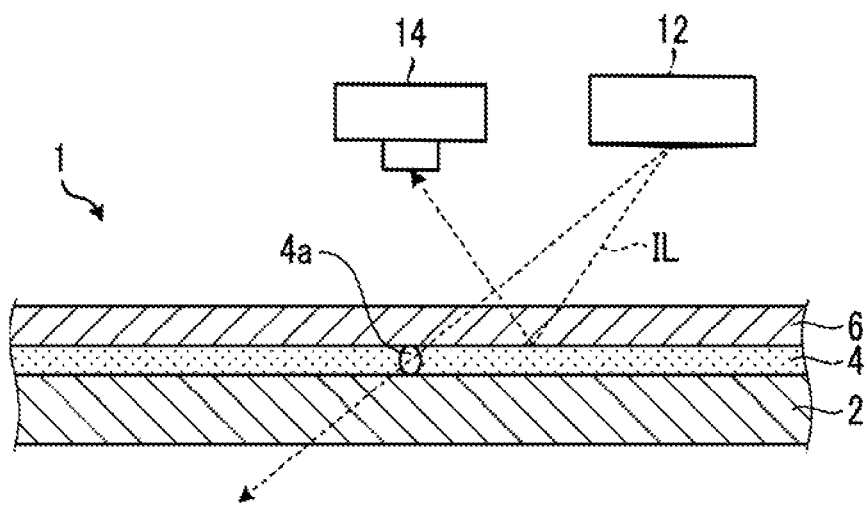
FIG. 11 is a flowchart showing one example of a processing flow of an inspection device according to a modification example of the second embodiment.
FIG. 12 is a diagram for describing a method for disposing an infrared light source and an infrared camera according to a third embodiment.

The processing contents of the inspection device according to the modification example of the second embodiment will be described with reference to FIG. 11. FIG. 11 is a flowchart showing one example of a processing flow of the inspection device according to the modification example of the second embodiment.

Since the processes of step S40 and step S42 are the same as the processes of step S30 and step S32 shown in FIG. 10, respectively, the descriptions will be omitted. Since the processes of step S44 to step S48 are the same as the processes of step S24 to step S28, respectively, the descriptions will be omitted.

As described above, in the modification example of the second embodiment, when the infrared light through blackbody radiation can be detected, it is determined that there is the scratch 4a on the conductive film 4, and when the infrared light through blackbody radiation cannot be detected, it is determined that there is no scratch 4a on the conductive film 4. Accordingly, in the modification example of the second embodiment, the presence or absence of the scratch 4a on the conductive film 4 can be easily determined.

In the second embodiment and the modification example of the second embodiment, the base material 2 is heated by the heating device 22, and an inspection for the scratch 4a on the conductive film 4 is performed based on the infrared light released from the base material 2 through blackbody radiation; however, the present disclosure is not limited thereto. For example, by heating the conductive film 4 itself through causing a current to flow through the conductive film 4, and allowing the infrared light to be released from the conductive film 4 through blackbody radiation, the conductive film 4 may be used as an infrared light source. In this case, when there is the scratch 4a on the conductive film 4, the current does not flow through the portion, so that the infrared light is not released. For this reason, even in the case of causing a current to flow through the conductive film 4, the scratch 4a on the conductive film 4 can be detected.

Third Embodiment

Next, a third embodiment will be described. Since a configuration of an inspection device according to the third embodiment is the same as that of the inspection device 10 shown in FIG. 3, the description will be omitted.

A method for disposing the infrared light source 12 and the infrared camera 14 according to the third embodiment will be described with reference to FIG. 12. FIG. 12 is a diagram for describing the method for disposing the infrared light source 12 and the infrared camera 14 according to the third embodiment.

As shown in FIG. 12, the infrared light source 12 and the infrared camera 14 are disposed side by side to face the inspection target 1. For example, the infrared light source 12 and the infrared camera 14 are disposed to face the top coat 6.

The infrared light source 12 emits the infrared light IL to the top coat 6. When there is the scratch 4a on the conductive film 4, the infrared light IL with which the top coat 6 is irradiated transmits through the base material 2 through the scratch 4a. When there is no scratch 4a on the conductive film 4, the infrared light IL with which the top coat 6 is irradiated is reflected to a top coat 5 side by the conductive film 4.

The infrared camera 14 detects the infrared light IL with which the top coat 6 is irradiated by the infrared light source 12. When there is the scratch 4a on the conductive film 4, the infrared light with which the top coat 6 is irradiated by the infrared light source 12 transmits through the base material 2, so that the infrared camera 14 does not detect the infrared light IL. When there is no scratch 4a on the conductive film 4, the infrared light IL with which the top coat 6 is irradiated by the infrared light source 12 is reflected by the conductive film 4, so that the infrared camera 14 detects the infrared light IL. Namely, in the third embodiment, when the degree of the scratch 4a is large, the detection intensity of the infrared light IL becomes weak, and when the degree of the scratch 4a is small, the detection intensity of the infrared light IL becomes strong.

In FIG. 12, for example, the infrared light source 12 and the infrared camera 14 may be surrounded by a light-shading object (not shown) that covers the entire periphery from the upper surface of the top coat 6. By surrounding the entirety of the infrared light source 12 and the infrared camera with the light-shading object, the infrared camera 14 is configured to be able to detect only the infrared light IL emitted by the infrared light source 12. Accordingly, in the present embodiment, the detection sensitivity of the infrared light is improved.

11                                                                                    12

Figures 13, 14:
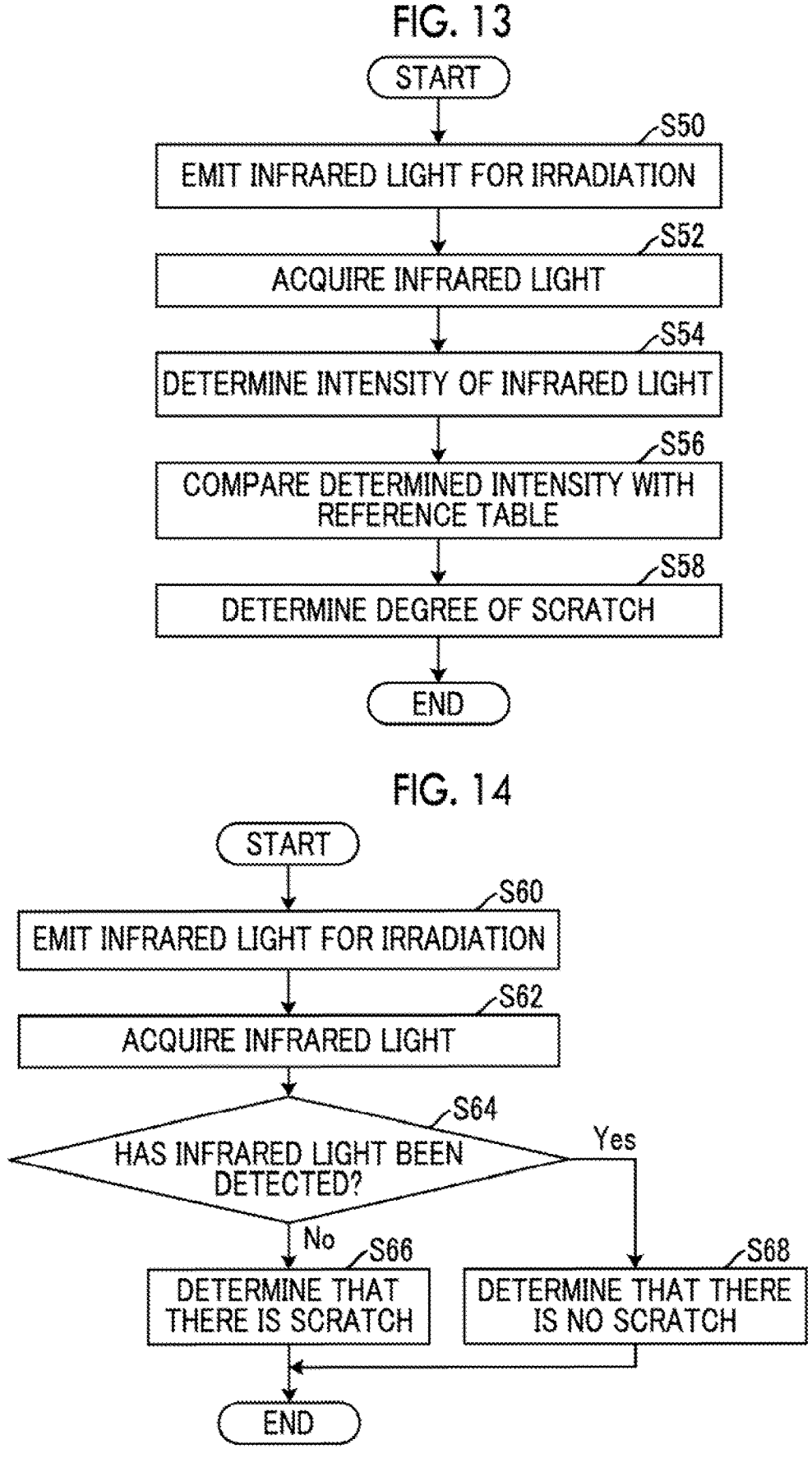
FIG. 13 is a flowchart showing one example of a processing flow of an inspection device according to the third embodiment.
FIG. 14 is a flowchart showing one example of a processing flow of an inspection device according to a modification example of the third embodiment.

Processing contents of the inspection device according to the third embodiment will be described with reference to FIG. 13. FIG. 13 is a flowchart showing one example of a processing flow of the inspection device according to the third embodiment.

The control device 20 causes the infrared light to be emitted for irradiation (step S50). Specifically, the light source control unit 30 controls the infrared light source 12 to irradiate the top coat 6 with the infrared light. More specifically, the light source control unit 30 controls the infrared light source 12 to irradiate the top coat 6 with light having a predetermined area. Then, the process proceeds to step S52.

The control device 20 acquires the infrared light (step S52). Specifically, the infrared acquisition unit 32 controls the infrared camera 14 to detect the infrared light reflected by the inspection target 1, and acquires the detected infrared light. Then, the process proceeds to step S54.

Since the processes of step S54 to step S58 are the same as the processes of step S14 to step S18 shown in FIG. 6, respectively, the descriptions will be omitted.

In the third embodiment, the storage unit 16 stores a reference table corresponding to the example shown in FIG. 12.

As described above, in the third embodiment, the degree of the scratch 4a on the conductive film 4 is determined based on the detection intensity of the infrared light reflected by the inspection target. Accordingly, in the third embodiment, the presence or absence of the scratch 4a on the conductive film 4 and the degree of the scratch 4a can be easily determined.

Processing Contents of Modification Example of Third Embodiment

Next, processing contents of a modification example of the third embodiment will be described. Since a configuration of an inspection device according to the modification example of the third embodiment is the same as that of the inspection device 10 shown in FIG. 3, the description will be omitted.

In the third embodiment, the degree of the scratch 4a on the conductive film 4 is determined based on the detection intensity of the infrared light IL reflected by the inspection target 1; however, the present disclosure is not limited thereto. In the modification example of the third embodiment, when the infrared light IL reflected by the inspection target is detected, it may be determined that there is no scratch, and when the infrared light IL is not detected, it may be determined that there is a scratch.

The processing contents of the inspection device according to the modification example of the third embodiment will be described with reference to FIG. 14. FIG. 14 is a flowchart showing one example of a processing flow of the inspection device according to the modification example of the third embodiment.

Since the processes of step S60 and step S62 are the same as the processes of step S50 and step S52 shown in FIG. 13, respectively, the descriptions will be omitted.

The control device 20 determines whether or not the infrared light has been detected (step S64). Specifically, the intensity determination unit 34 determines whether or not the infrared camera 14 has detected the infrared light reflected from the inspection target 1. When it is not determined that the infrared light has been detected (step S64: No), the process proceeds to step S66. When it is determined that the infrared light has been detected (step S64: Yes), the process proceeds to step S68.

When the result in step S64 is determined to be No, the control device 20 determines that there is a scratch (step S66). Specifically, the scratch determination unit 36 determines that there is the scratch 4a on the conductive film 4. Then, the processing in FIG. 14 is terminated.

When the result in step S64 is determined to be Yes, the control device 20 determines that there is no scratch (step S68). Specifically, the scratch determination unit 36 determines that there is no scratch 4a on the conductive film 4. Then, the processing in FIG. 14 is terminated.

As described above, in the modification example of the third embodiment, when the infrared light reflected by the inspection target can be detected, it is determined that there is no scratch 4a on the conductive film 4, and when the infrared light cannot be detected, it is determined that there is the scratch 4a on the conductive film 4. Accordingly, in the modification example of the third embodiment, the presence or absence of the scratch 4a on the conductive film 4 can be easily determined.

Fourth Embodiment

Next, a fourth embodiment will be described. Since a configuration of an inspection device according to the fourth embodiment is the same as that of the inspection device 10 shown in FIG. 3, the description will be omitted.

Figures 15, 16:
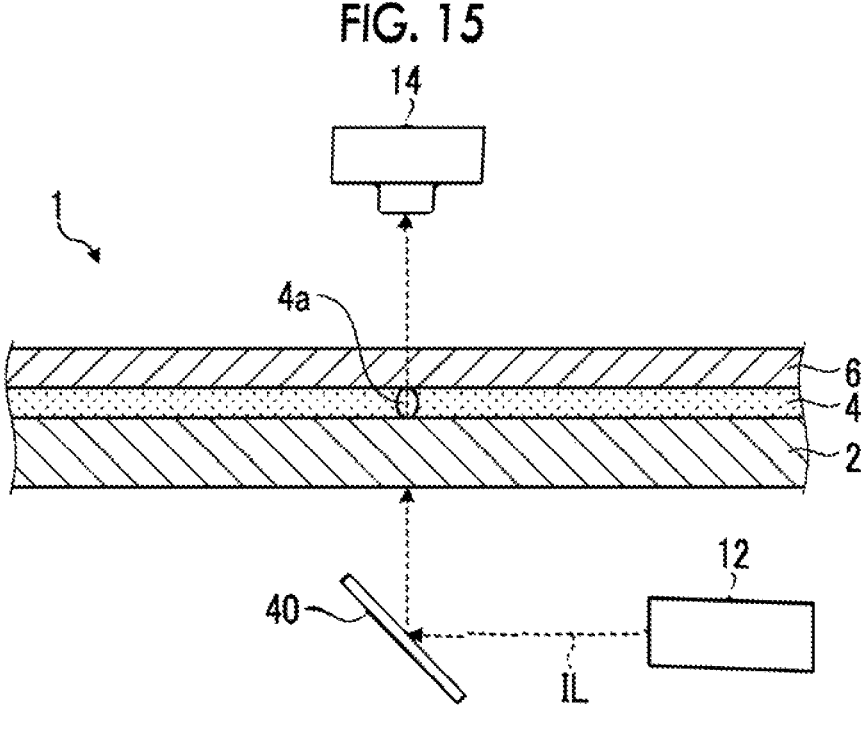
FIG. 15 is a diagram for describing a method for disposing an infrared light source and an infrared camera according to a fourth embodiment.
FIG. 16 is a flowchart showing one example of a processing flow of an inspection device according to the fourth embodiment.

A method for disposing the infrared light source 12 and the infrared camera 14 according to the fourth embodiment will be described with reference to FIG. 15. FIG. 15 is a diagram for describing the method for disposing the infrared light source 12 and the infrared camera 14 according to the fourth embodiment.

As shown in FIG. 15, the infrared light source 12 and the infrared camera 14 are disposed to face each other with the inspection target 1 interposed therebetween. For example, the infrared light source 12 is disposed to face the base material 2. For example, the infrared camera 14 is disposed to face the top coat 6. In addition, in the fourth embodiment, a mirror 40 is disposed side by side with the infrared light source 12 on a base material 2 side.

The infrared light source 12 emits the infrared light IL to the mirror 40. The mirror 40 reflects the infrared light IL to the base material 2. The mirror 40 is installed to reflect the infrared light IL so as to be aligned with an optical axis of the infrared camera 14. Accordingly, in the present embodiment, the infrared light source 12 can be regarded as a surface light source, and the detection sensitivity can be improved.

[Processing Contents]

Processing contents of the inspection device according to the fourth embodiment will be described with reference to FIG. 16. FIG. 16 is a flowchart showing one example of a processing flow of the inspection device according to the fourth embodiment.

The control device 20 causes the mirror 40 to be irradiated with the infrared light (step S70). Specifically, the light source control unit 30 controls the infrared light source 12 to irradiate the mirror 40 with the infrared light IL, and causes the infrared light IL to be reflected to the base material 2. Then, the process proceeds to step S72.

The control device 20 acquires the infrared light (step S72). Specifically, the infrared acquisition unit 32 controls the infrared camera 14 to detect the infrared light IL reflected by the mirror 40, and acquires the detected infrared light. Then, the process proceeds to step S74.

Since the processes of step S74 to step S78 are the same as the processes of step S14 to step S18 shown in FIG. 6, respectively, the descriptions will be omitted.

In the fourth embodiment, the storage unit 16 stores a reference table corresponding to the example shown in FIG. 15.

As described above, in the fourth embodiment, the degree of the scratch 4a on the conductive film 4 is determined based on the detection intensity of the infrared light reflected by the mirror 40. Accordingly, in the fourth embodiment, the presence or absence of the scratch 4a on the conductive film 4 and the degree of the scratch 4a can be easily determined.

Processing Contents of Modification Example of Fourth Embodiment

Next, processing contents of a modification example of the fourth embodiment will be described. Since a configuration of an inspection device according to the modification example of the fourth embodiment is the same as that of the inspection device 10 shown in FIG. 3, the description will be omitted.

In the fourth embodiment, the degree of the scratch 4a on the conductive film 4 is determined based on the detection intensity of the infrared light IL reflected by the mirror 40; however, the present disclosure is not limited thereto. In the modification example of the fourth embodiment, when the infrared light IL reflected by the mirror 40 is detected, it may be determined that there is a scratch, and when the infrared light IL is not detected, it may be determined that there is no scratch.

The processing contents of the inspection device according to the modification example of the fourth embodiment will be described with reference to FIG. 17. FIG. 17 is a flowchart showing one example of a processing flow of the inspection device according to the modification example of the fourth embodiment.

Since the processes of step S80 and step S82 are the same as the processes of step S60 and step S62 shown in FIG. 16, respectively, the descriptions will be omitted. Since the processes of step S84 to step S88 are the same as the processes of step S24 to step S28 shown in FIG. 7, respectively, the descriptions will be omitted.

As described above, in the modification example of the fourth embodiment, when the infrared light reflected by the mirror 40 can be detected, it is determined that there is the scratch 4a on the conductive film 4, and when the infrared light cannot be detected, it is determined that there is no scratch 4a on the conductive film 4. Accordingly, in the modification example of the fourth embodiment, the presence or absence of the scratch 4a on the conductive film 4 can be easily determined.

Fifth Embodiment

Next, a fifth embodiment will be described. Since a configuration of an inspection device according to the fifth embodiment is the same as that of the inspection device 10 shown in FIG. 3, the description will be omitted.

A method for disposing the infrared light source 12 and the infrared camera 14 according to the fifth embodiment will be described with reference to FIG. 18. FIG. 18 is a diagram for describing the method for disposing the infrared light source 12 and the infrared camera 14 according to the fifth embodiment.

As shown in FIG. 18, the infrared light source 12 and the infrared camera 14 are disposed side by side to face the inspection target 1. For example, the infrared light source 12 and the infrared camera 14 are disposed to face the top coat 6. In addition, in the fifth embodiment, the mirror 40 is disposed side by side with the infrared camera 14 on the top coat 6 side.

The infrared light source 12 emits the infrared light IL to the mirror 40. The mirror 40 reflects the infrared light IL to the top coat 6. When there is the scratch 4a on the conductive film 4, the infrared light reflected to the top coat 6 by the mirror 40 transmits through the base material 2, so that the infrared camera 14 does not detect the infrared light IL. When there is no scratch 4a on the conductive film 4, the infrared light IL reflected to the top coat 6 by the mirror 40 is reflected by the conductive film 4, so that the infrared camera 14 detects the infrared light IL.

In FIG. 18, for example, the infrared light source 12, the infrared camera 14, and the mirror 40 may be surrounded by a light-shading object (not shown) that covers the entire periphery from the upper surface of the top coat 6. By surrounding the entirety of the infrared light source 12 and the infrared camera with the light-shading object, the infrared camera 14 is configured to be able to detect only the infrared light IL emitted by the infrared light source 12. Accordingly, the detection sensitivity of the infrared light is improved.

[Processing Contents]

Figures 19, 20:
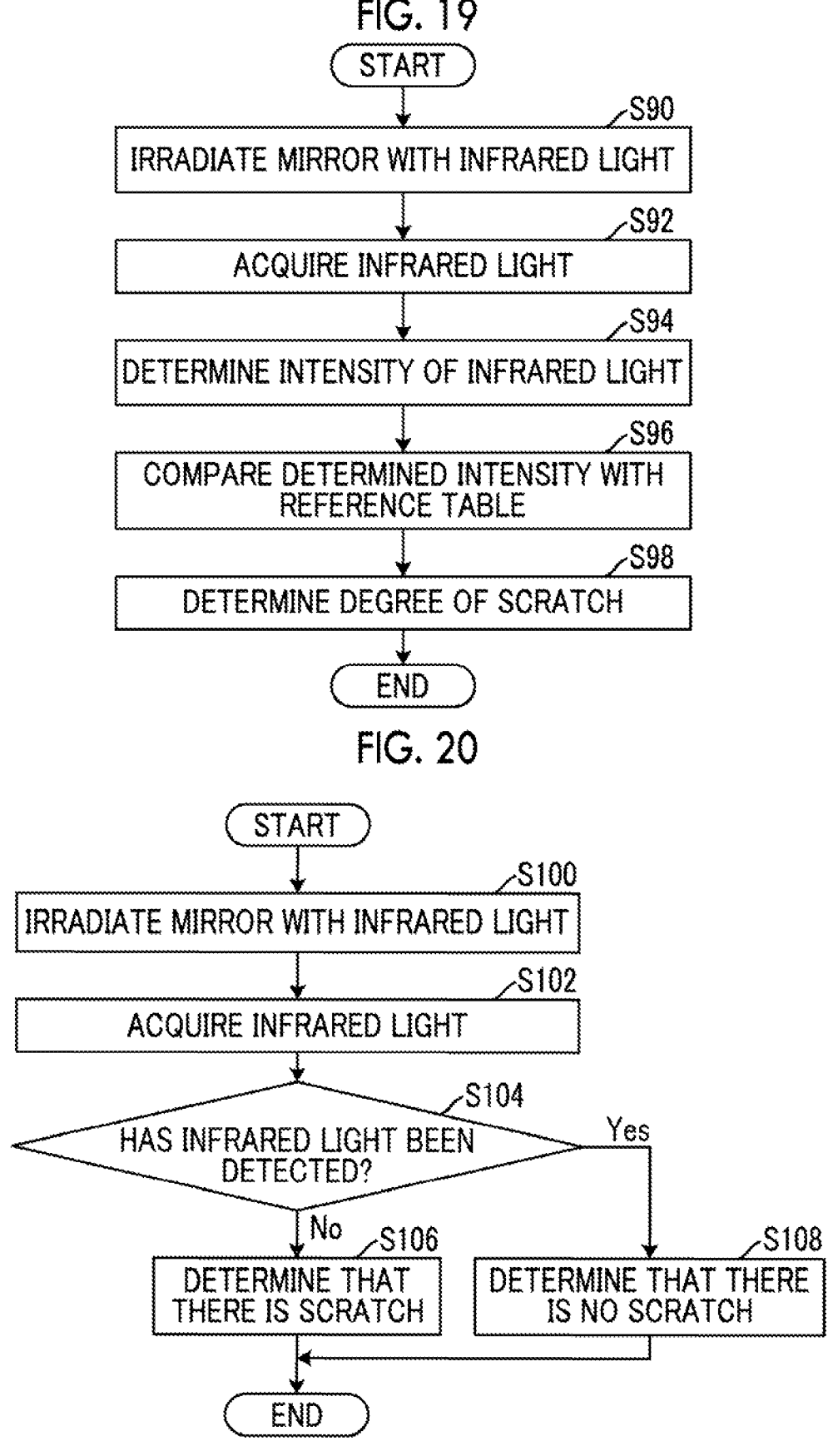
FIG. 19 is a flowchart showing one example of a processing flow of an inspection device according to the fifth embodiment.
FIG. 20 is a flowchart showing one example of a processing flow of an inspection device according to a modification example of the fifth embodiment.

Processing contents of the inspection device according to the fifth embodiment will be described with reference to FIG. 19. FIG. 19 is a flowchart showing one example of a processing flow of the inspection device according to the fifth embodiment.

The control device 20 causes the mirror 40 to be irradiated with the infrared light (step S90). Specifically, the light source control unit 30 controls the infrared light source 12 to irradiate the mirror 40 with the infrared light IL, and causes the infrared light IL to be reflected to the top coat 6. Then, the process proceeds to step S92.

The control device 20 acquires the infrared light (step S92). Specifically, the infrared acquisition unit 32 controls the infrared camera 14 to detect the infrared light IL reflected by the mirror 40 and reflected by the top coat 6, and acquires the detected infrared light. Then, the process proceeds to step S94.

Since the processes of step S94 to step S98 are the same as the processes of step S14 to step S18 shown in FIG. 6, respectively, the descriptions will be omitted.

In the fifth embodiment, the storage unit 16 stores a reference table corresponding to the example shown in FIG. 18.

As described above, in the fifth embodiment, the degree of the scratch 4a on the conductive film 4 is determined based on the detection intensity of the infrared light reflected by the mirror 40 and reflected by the inspection target 1. Accordingly, in the fifth embodiment, the presence or absence of the scratch 4a on the conductive film 4 and the degree of the scratch 4a can be easily determined.

Processing Contents of Modification Example of Fifth Embodiment

Next, processing contents of a modification example of the fifth embodiment will be described. Since a configuration of an inspection device according to the modification example of the fifth embodiment is the same as that of the inspection device 10 shown in FIG. 3, the description will be omitted.

In the fifth embodiment, the degree of the scratch 4a on the conductive film 4 is determined based on the detection intensity of the infrared light IL reflected by the mirror 40 and reflected by the top coat 6; however, the present disclosure is not limited thereto. In the modification example of the fifth embodiment, when the infrared light IL reflected by the mirror 40 and reflected by the top coat 6 is detected, it may be determined that there is no scratch, and when the infrared light IL is not detected, it may be determined that there is a scratch.

The processing contents of the inspection device according to the modification example of the fifth embodiment will be described with reference to FIG. 20. FIG. 20 is a flowchart showing one example of a processing flow of the inspection device according to the modification example of the fifth embodiment.

Since the processes of step S100 and step S102 are the same as the processes of step S90 and step S92 shown in FIG. 19, respectively, the descriptions will be omitted. Since the processes of step S104 to step S108 are the same as the processes of step S64 to step S68 shown in FIG. 14, respectively, the descriptions will be omitted.

As described above, in the modification example of the fifth embodiment, when the infrared light reflected by the mirror 40 and reflected by the top coat 6 can be detected, it is determined that there is no scratch 4a on the conductive film 4, and when the infrared light cannot be detected, it is determined that there is the scratch 4a on the conductive film 4. Accordingly, in the modification example of the fifth embodiment, the presence or absence of the scratch 4a on the conductive film 4 can be easily determined.

In the fifth embodiment and the modification example of the fifth embodiment, the mirror 40 is used; however, the present disclosure is not limited thereto. For example, a half mirror may be used instead of the mirror 40.

Figure 21:
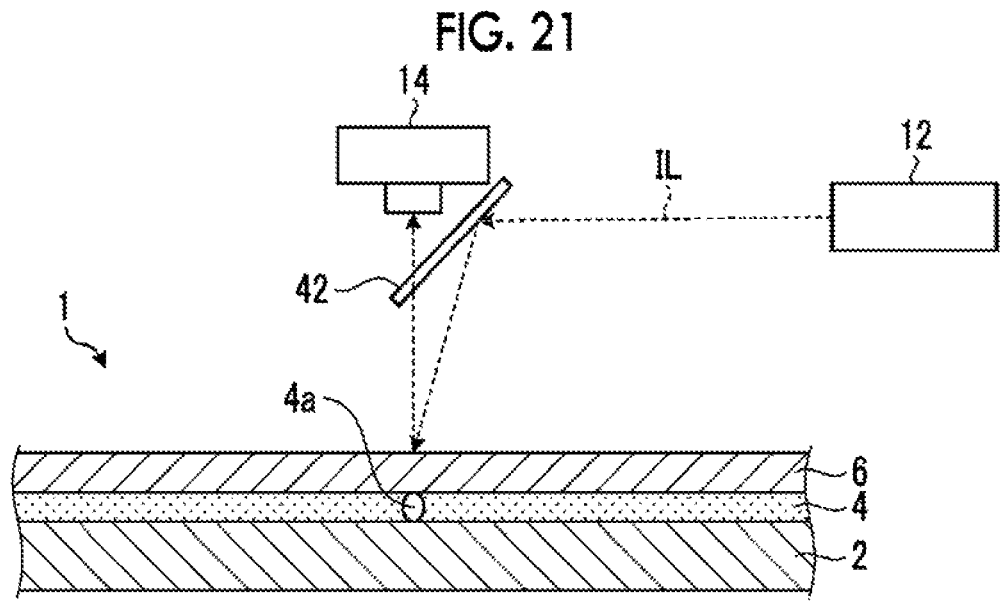
FIG. 21 is a diagram for describing a method for disposing a half mirror in the fifth embodiment.

FIG. 21 is a diagram for describing a method for disposing the half mirror in the fifth embodiment. As shown in FIG. 21, a half mirror 42 is installed such that the infrared light from the infrared light source 12 is reflected by the top coat 6 and the reflected light from the top coat 6 is aligned with the optical axis of the infrared camera 14. In this case, the reflected light from the top coat 6 transmits through the half mirror 42 and is incident on the infrared camera 14. Accordingly, the infrared camera 14 and the infrared light can have the same axis, and the detection sensitivity can be improved.

Sixth Embodiment

Figure 22:
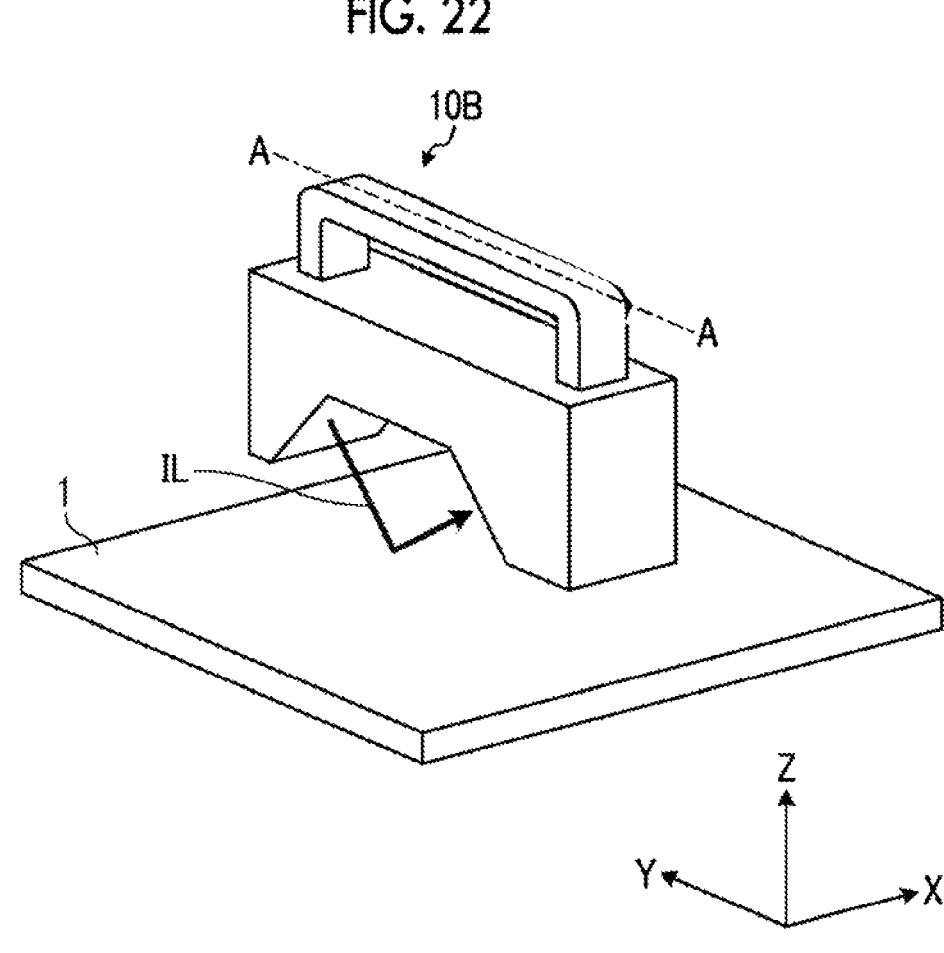
FIG. 22 is a diagram showing a configuration example of an inspection device according to a sixth embodiment.
Figure 23:
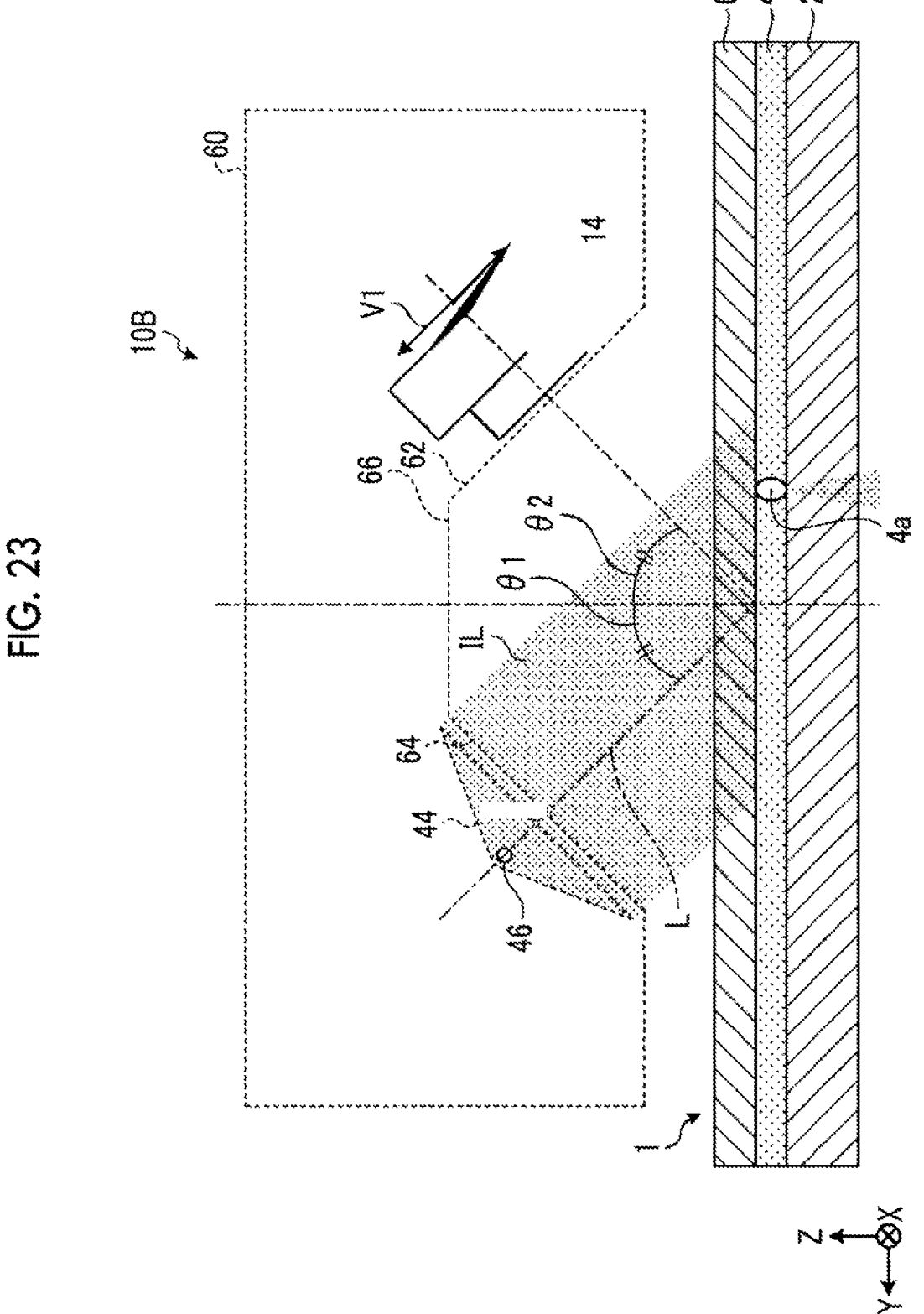
FIG. 23 is a cross-sectional view of the inspection device according to the sixth embodiment.

Next, a sixth embodiment of the present disclosure will be described. FIG. 22 is a diagram showing a configuration example of an inspection device according to the sixth embodiment. FIG. 23 is a cross-sectional view of the inspection device according to the sixth embodiment. In an inspection device 10B according to the sixth embodiment, an infrared camera and an infrared light source are integrated.

As shown in FIG. 22, the inspection device 10B is installed with respect to the inspection target 1. The inspection device 10B irradiates the inspection target 1 with the infrared light IL. The inspection device 10B detects the infrared light IL reflected by the inspection target 1. The inspection device 10B determines the presence or absence of a scratch inside the inspection target 1 based on the infrared light IL reflected by the inspection target 1. The inspection device 10B inspects the entirety of the inspection target 1 by moving over the inspection target 1.

FIG. 23 is a cross-sectional view taken along line A-A in FIG. 22. As shown in FIG. 23, the inspection device 10B includes the infrared camera 14, a parabolic mirror 44, a point light source 46, and a housing 60. In the sixth embodiment, the infrared camera the parabolic mirror 44, and the point light source 46 are disposed inside the housing 60.

The housing 60 has a shape that is long in a Y-axis direction. The housing 60 includes an inclined surface 62, an inclined surface 64, and a horizontal surface 66.

The inclined surface 62 is an inclined surface that is inclined downward at a predetermined angle from one end of the horizontal surface 66 in a negative Y-axis direction. The inclined surface 64 is an inclined surface that is inclined downward at a predetermined angle from the other end of the horizontal surface 66 in a positive Y-axis direction. The horizontal surface 66 is a surface that is connected to one end of the inclined surface 62 and one end of the inclined surface 64, and that is parallel to the inspection target 1. The inclined surface 62, the inclined surface 64, and the horizontal surface 66 are made of, for example, an infrared transmissive filter or a transparent material that can transmit infrared light.

In the infrared camera 14, a lens of the infrared camera 14 is disposed along the inclined surface 62 inside the housing 60. The infrared camera 14 detects the infrared light IL reflected by the inspection target 1. The inclined surface 62 is set at an angle where the infrared camera 14 can appropriately detect the infrared light IL reflected by the inspection target 1.

The infrared camera 14 may be fixed to the inclined surface 62 or may include a position adjustment mechanism that is movable along arrow V1. Since the infrared camera 14 includes the position adjustment mechanism, the optical axis of the infrared camera 14 can be set to coincide with a reflection direction of the infrared light IL reflected by the inspection target 1, so that the infrared light IL can be more appropriately detected.

In the parabolic mirror 44, an irradiation surface of the infrared light is disposed along the inclined surface 64 inside the housing 60. The parabolic mirror 44 reflects the infrared light emitted for irradiation by the point light source 46, and irradiates the inspection target 1 with the infrared light. The parabolic mirror 44 uniformly surface-irradiates a predetermined range of the inspection target 1 with the infrared light. The angle of the inclined surface 64 is set such that the parabolic mirror 44 can appropriately irradiate the inspection target 1 with the infrared light IL.

The point light source 46 is a point light source that emits infrared light. The point light source 46 is disposed between a reflecting surface of the parabolic mirror 44 and the inclined surface 64. The point light source 46 is disposed at a position where the point light source 46 can irradiate the reflecting surface of the parabolic mirror 44 with the infrared light. For example, it is preferable that the point light source 46 is disposed at the focal position of the parabolic mirror 44.

In the sixth embodiment, the parabolic mirror 44 and the point light source 46 form a surface light source. The parabolic mirror 44 and the point light source 46 can uniformly irradiate a wide range of the inspection target 1 with the infrared light IL. The irradiation range of the infrared light IL can be adjusted by changing the shape of the parabolic mirror 44, the amount of light of the point light source 46, and the like.

The infrared light IL with which the inspection target 1 is irradiated transmits through the top coat 6, is reflected by the conductive film 4, and is incident on the infrared camera 14. When there is the scratch 4a on the conductive film 4, the infrared light IL with which the portion of the scratch 4a is irradiated transmits through the scratch 4a and the base material 2, so that the infrared light IL is not incident on the infrared camera 14. It is preferable that the wavelength of the infrared light IL is approximately 1 μm to 5 μm or 8 μm to 12 μm. The wavelength of the infrared light IL may be changed as appropriate depending on the materials of the top coat 6 and the conductive film 4 and the like.

The infrared camera 14, the parabolic mirror 44, and the point light source 46 are disposed at positions where an optical axis L of the infrared light IL reflected by the inspection target 1 and the optical axis of the lens of the infrared camera 14 coincide with each other. In the sixth embodiment, an incident angle θ1 of the infrared light IL to the inspection target 1 and a reflection angle θ2 from the inspection target 1 are equal to each other. Namely, the infrared light IL is positively reflected by the inspection target 1 and is incident on the lens of the infrared camera 14.

The incident angle θ1 and the reflection angle θ2 are, for example, 45 degrees; however, the present disclosure is not limited thereto. Each of the incident angle θ1 and the reflection angle θ2 may be larger than 45 degrees or smaller than 45 degrees. Namely, in the sixth embodiment, the incident angle θ1 and the reflection angle θ2 are not particularly limited.

As described above, in the sixth embodiment, since the infrared light source is formed of the parabolic mirror 44 and the point light source 46, a surface light source that uniformly irradiates a predetermined range with infrared light can be constructed. Accordingly, in the sixth embodiment, the presence or absence of a scratch over a wide range can be inspected at once, and the SN ratio can be improved.

In addition, in the sixth embodiment, since an optical axis of the infrared light source and the optical axis of the lens of the infrared camera 14 can be easily set to coincide with each other by integrally configuring the infrared camera 14 and the infrared light source, uniform irradiation with the infrared light becomes easy.

Modification Example of Sixth Embodiment

Figure 24:
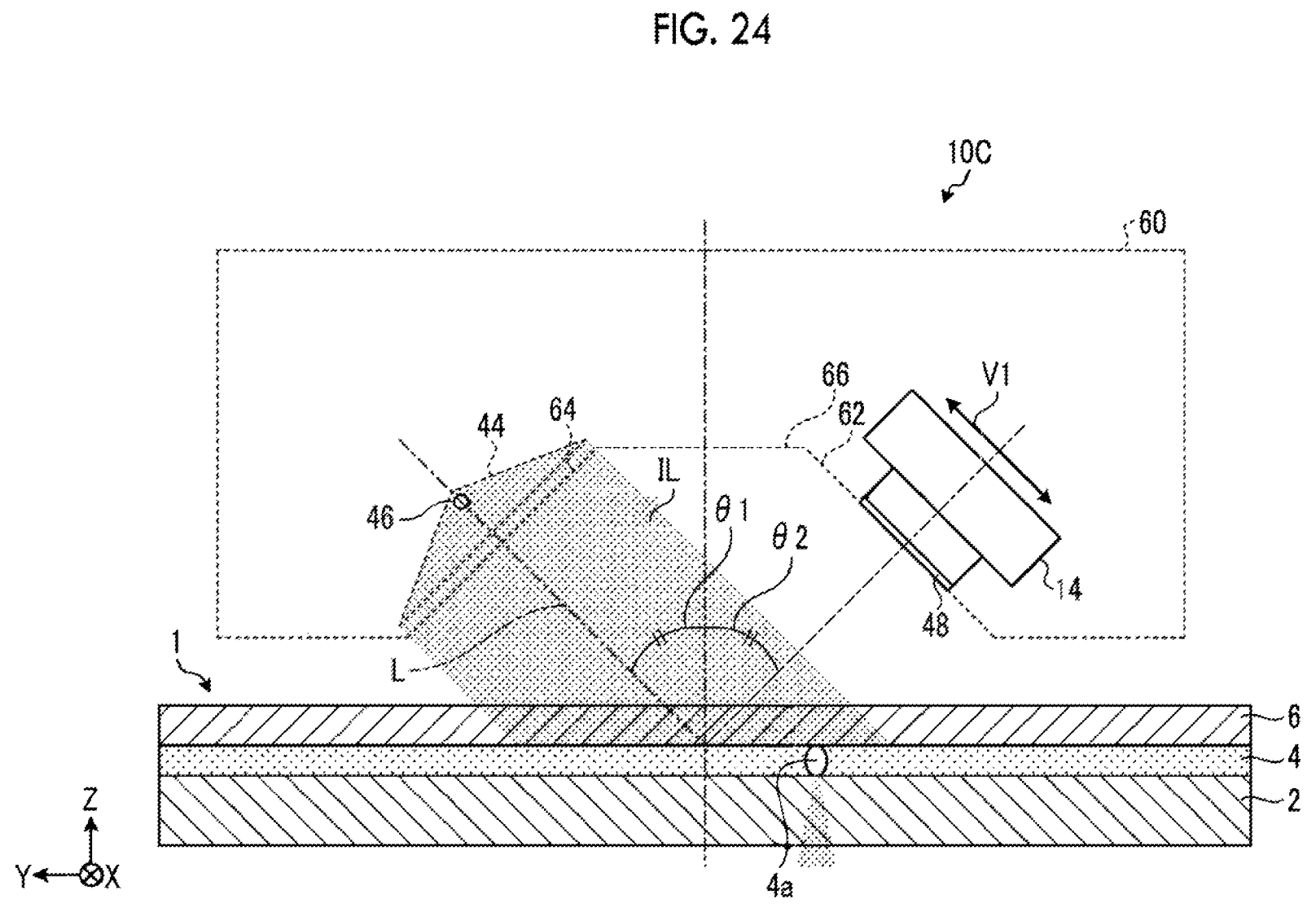

A modification example of the sixth embodiment of the present disclosure will be described. FIG. 24 is a cross-sectional view of an inspection device according to the modification example of the sixth embodiment. FIG. 24 corresponds to the cross-sectional view taken along line A-A in FIG. 22. An inspection device 10C according to the modification example of the sixth embodiment is different from the inspection device 10B shown in FIG. 23 in that a filter 48 is provided.

The filter 48 is configured as a wavelength-selective filter or a polarizing filter that transmits only a specific wavelength. For example, the filter 48 is disposed in front of the lens of the infrared camera 14. For example, the filter 48 is configured to be mountable on the lens of the infrared camera 14. The infrared camera 14 may be configured such that the filter 48 is mountable on the lens. In the modification example of the sixth embodiment, the infrared camera 14 detects the infrared light IL through the filter 48.

In the example shown in FIG. 24, the filter 48 is shown as being disposed in front of the lens of the infrared camera 14; however, the present disclosure is not limited thereto. For example, the filter 48 may be disposed in front of the reflecting surface of the parabolic mirror 44. In this case, the inspection target 1 is irradiated with the infrared light IL through the filter 48. For example, the filters 48 may be disposed both in front of the lens of the infrared camera 14 and in front of the reflecting surface of the parabolic mirror 44. Namely, the filter 48 may be disposed in front of at least one of the lens of the infrared camera 14 and the parabolic mirror 44.

For example, when the influence of an environment such as external light is large, by disposing the filter 48 in front of the infrared camera 14, the infrared camera 14 is allowed to detect only infrared light of a desired wavelength, so that the SN ratio can be improved.

For example, by disposing the filter 48 in front of the parabolic mirror 44, only infrared light of a desired wavelength is allowed to be incident on the infrared camera 14, so that the SN ratio can be improved.

When the filter 48 is a polarizing filter, the SN ratio is improved when an opening direction of the scratch 4a and a direction of a polarizing surface of the filter 48 are set to coincide with each other. For this reason, when the filter 48 is a polarizing filter, a rotation mechanism that rotates the polarizing surface of the filter may be provided. Accordingly, the scratch 4a is inspected while rotating the polarizing surface of the filter 48 via the rotation mechanism, so that the capability of detecting the scratch 4a can be improved. In addition, since the opening direction of the scratch 4a is usually not known, the time taken to detect the scratch 4a can be shortened by rotating the polarizing surface of the filter 48 via the rotation mechanism. The rotation mechanism may have a function that allows a user to manually rotate the polarizing surface.

Seventh Embodiment

Figure 25:
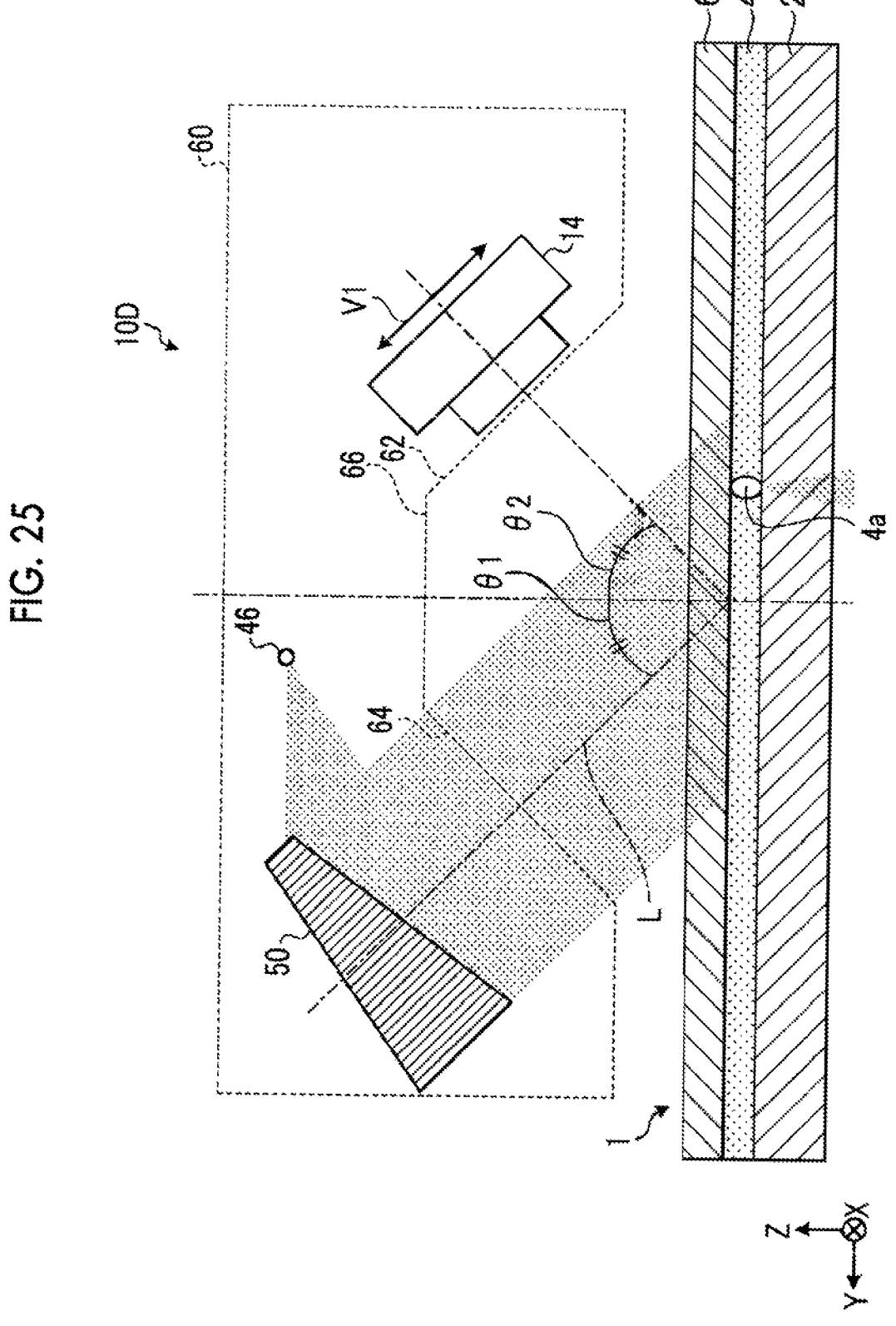
FIG. 25 is a cross-sectional view of an inspection device according to a seventh embodiment.

A seventh embodiment of the present disclosure will be described. FIG. 25 is a cross-sectional view of an inspection device according to the seventh embodiment.

FIG. 25 corresponds to the cross-sectional view taken along line A-A in FIG. 22. An inspection device 10D according to the seventh embodiment is different from the inspection device 10B shown in FIG. 23 in that an off-axis parabolic mirror 50 is provided instead of the parabolic mirror 44.

In the seventh embodiment, the point light source 46 is disposed above the horizontal surface 66 inside the housing 60. The point light source 46 is disposed at a position where the point light source 46 can irradiate a reflecting surface of the off-axis parabolic mirror 50 with the infrared light.

The off-axis parabolic mirror 50 is disposed away from the inclined surface 64. The off-axis parabolic mirror 50 is disposed such that the reflecting surface for the infrared light faces the inclined surface 64. The off-axis parabolic mirror 50 reflects the infrared light IL emitted for irradiation from the point light source 46, and irradiates the inspection target 1 with the infrared light IL through the inclined surface 64.

In the seventh embodiment, the point light source 46 and the off-axis parabolic mirror 50 form a surface light source. Since the surface light source is configured using the off-axis parabolic mirror 50, compared to the case where the surface light source is configured using the parabolic mirror 44 as shown in FIG. 23, the infrared light can be more uniformly radiated to the inspection target 1. For example, it is preferable that the point light source 46 is disposed at the focal position of the off-axis parabolic mirror 50.

In the seventh embodiment as well, as shown in FIG. 24, the filter 48 may be disposed in front of at least one of the lens of the infrared camera 14 and the reflecting surface of the off-axis parabolic mirror 50.

Eighth Embodiment

Figure 26:
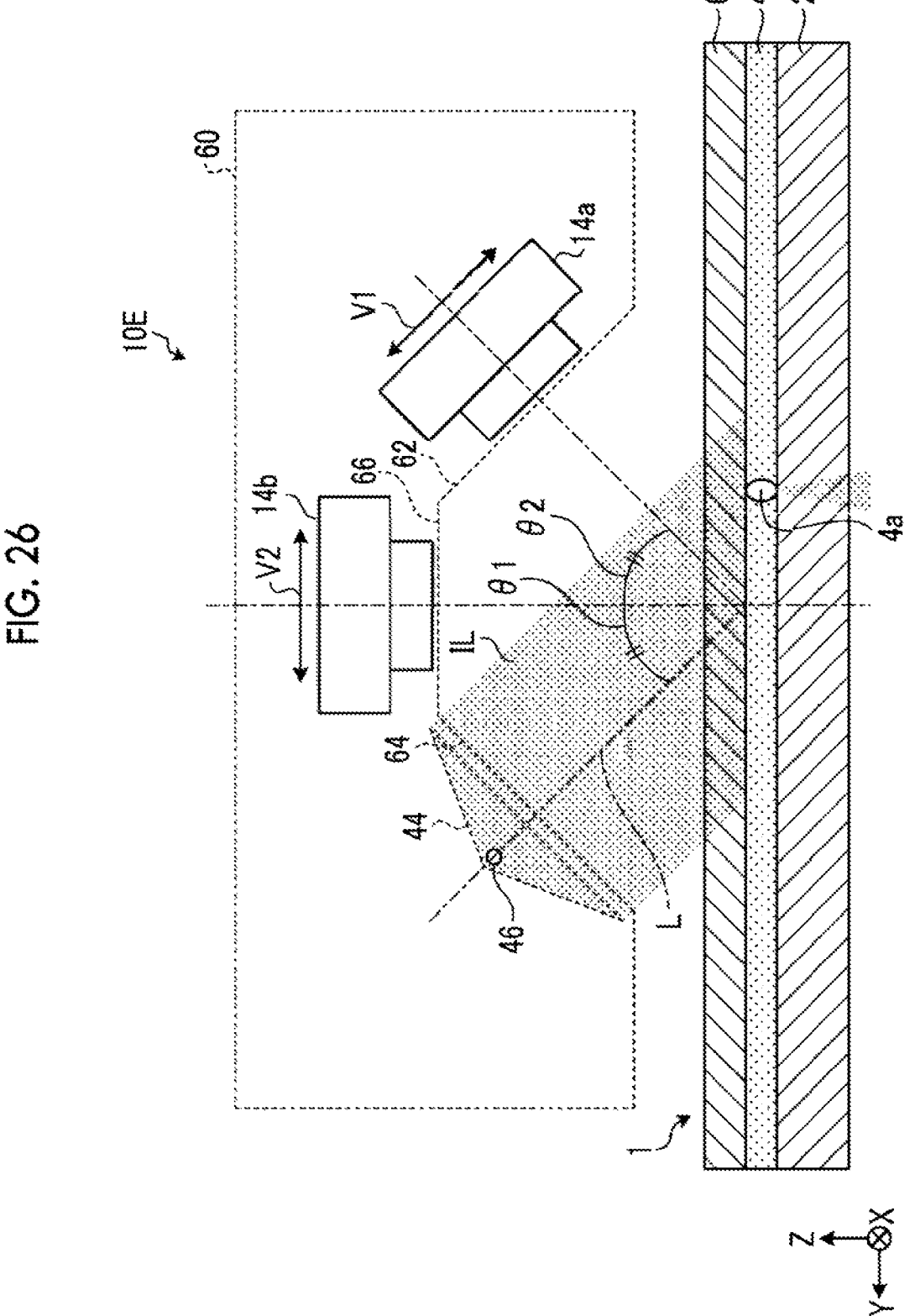
FIG. 26 is a cross-sectional view of an inspection device according to an eighth embodiment.

An eighth embodiment of the present disclosure will be described. FIG. 26 is a cross-sectional view of an inspection device according to the eighth embodiment. FIG. 26 corresponds to the cross-sectional view taken along line A-A in FIG. 22. FIG. 27 is a block diagram showing a configuration example of the inspection device according to the eighth embodiment. An inspection device 10E is different from the inspection device 10B shown in FIG. 23 in that two infrared cameras, a first infrared camera 14a and a second infrared camera 14b, are provided.

In the first infrared camera 14a, a lens of the first infrared camera 14a is disposed along the inclined surface 62 inside the housing 60. The first infrared camera 14a may be fixed to the inclined surface 62 or may include a position adjustment mechanism that is movable along arrow V1. The first infrared camera 14a detects the infrared light IL reflected by the inspection target 1.

In the second infrared camera 14b, a lens of the second infrared camera 14b is disposed along the horizontal surface 66 inside the housing 60. The second infrared camera 14b may be fixed to the horizontal surface 66 or may include a position adjustment mechanism that is movable along arrow V2. The second infrared camera 14b detects the infrared light IL reflected by the inspection target 1.

As shown in FIG. 27, a control device 20E includes a light source control unit 30E, an infrared acquisition unit 32E, an intensity determination unit 34E, and a scratch determination unit 36E.

The light source control unit 30E controls the point light source 46 to emit the infrared light for irradiation. The light source control unit 30E controls the point light source 46 to set a wavelength of the infrared light to be emitted for irradiation.

The infrared acquisition unit 32E controls the first infrared camera 14a and the second infrared camera 14b to detect the infrared light. The infrared acquisition unit 32E acquires the infrared light detected by the first infrared camera 14a and the second infrared camera 14b.

The intensity determination unit 34E determines the intensity of the infrared light. For example, the intensity determination unit 34E determines the intensities of the infrared light acquired from the first infrared camera 14a and the second infrared camera 14b.

The scratch determination unit 36E determines the degree of the scratch 4a on the conductive film 4. For example, the scratch determination unit 36E determines the degree of the scratch 4a on the conductive film 4 based on the intensities of the infrared light acquired from the first infrared camera 14a and the second infrared camera 14b, which are determined by the intensity determination unit 34E.

[Processing Contents]

Processing contents of the inspection device according to the eighth embodiment will be described with reference to FIG. 28. FIG. 28 is a flowchart showing one example of a processing flow of the inspection device according to the eighth embodiment.

The light source control unit 30E controls the infrared light source 12 to irradiate the inspection target 1 with the infrared light (step S120). Then, the process proceeds to step S122.

The infrared acquisition unit 32E controls the first infrared camera 14a to detect the infrared light reflected by the inspection target 1, and acquires the detected infrared light from the first infrared camera 14a (step S122). Then, the process proceeds to step S124.

The intensity determination unit 34E determines the intensity of the infrared light acquired by the infrared acquisition unit 32E from the first infrared camera 14a (step S124). Then, the process proceeds to step S126.

The infrared acquisition unit 32E controls the second infrared camera 14b to detect the infrared light reflected by the inspection target 1, and acquires the detected infrared light from the second infrared camera 14b (step S126). Then, the process proceeds to step S128.

The intensity determination unit 34E determines the intensity of the infrared light acquired by the infrared acquisition unit 32E from the second infrared camera 14b (step S128). Then, the process proceeds to step S130.

The scratch determination unit 36E determines the degree of the scratch 4a based on the intensities of the infrared light acquired from the first infrared camera 14a and the second infrared camera 14b (step S130). For example, the scratch determination unit 36E determines the degree of the scratch 4a based on a difference between the intensity of the infrared light acquired from the first infrared camera 14a and the intensity of the infrared light acquired from the second infrared camera 14b. For example, the scratch determination unit 36E may perform background correction by subtracting the detection result from the second infrared camera 14b from the detection result from the first infrared camera 14a, and may determine the degree of the scratch 4a based on the result of the background correction. For example, the scratch determination unit 36E may determine the degree of the scratch 4a based on an AND condition between the intensity of the infrared light acquired from the first infrared camera 14a and the intensity of the infrared light acquired from the second infrared camera 14b. For example, the scratch determination unit 36E determines the degree of the scratch 4a based on a correlation between the intensity of the infrared light acquired from the first infrared camera 14a and the intensity of the infrared light acquired from the second infrared camera 14b. Then, the processing in FIG. 28 is terminated.

In FIG. 28, the processes of step S122 and step S124 and the processes of step S126 and step S128 may be performed in parallel.

As described above, in the eighth embodiment, the degree of a scratch in the inspection target is determined based on the detection results of the first infrared camera 14a and the second infrared camera 14b disposed at different positions. Accordingly, in the eighth embodiment, the degree of the scratch can be more accurately determined.

In the eighth embodiment, the degree of a scratch in the inspection target has been described as being determined based on the detection results of the infrared light by the two cameras, the first infrared camera 14a and the second infrared camera 14b; however, the present disclosure is not limited thereto. In the present disclosure, the degree of a scratch in the inspection target may be determined based on detection results of the infrared light by three or more cameras disposed at different positions.

Ninth Embodiment

Figure 29:
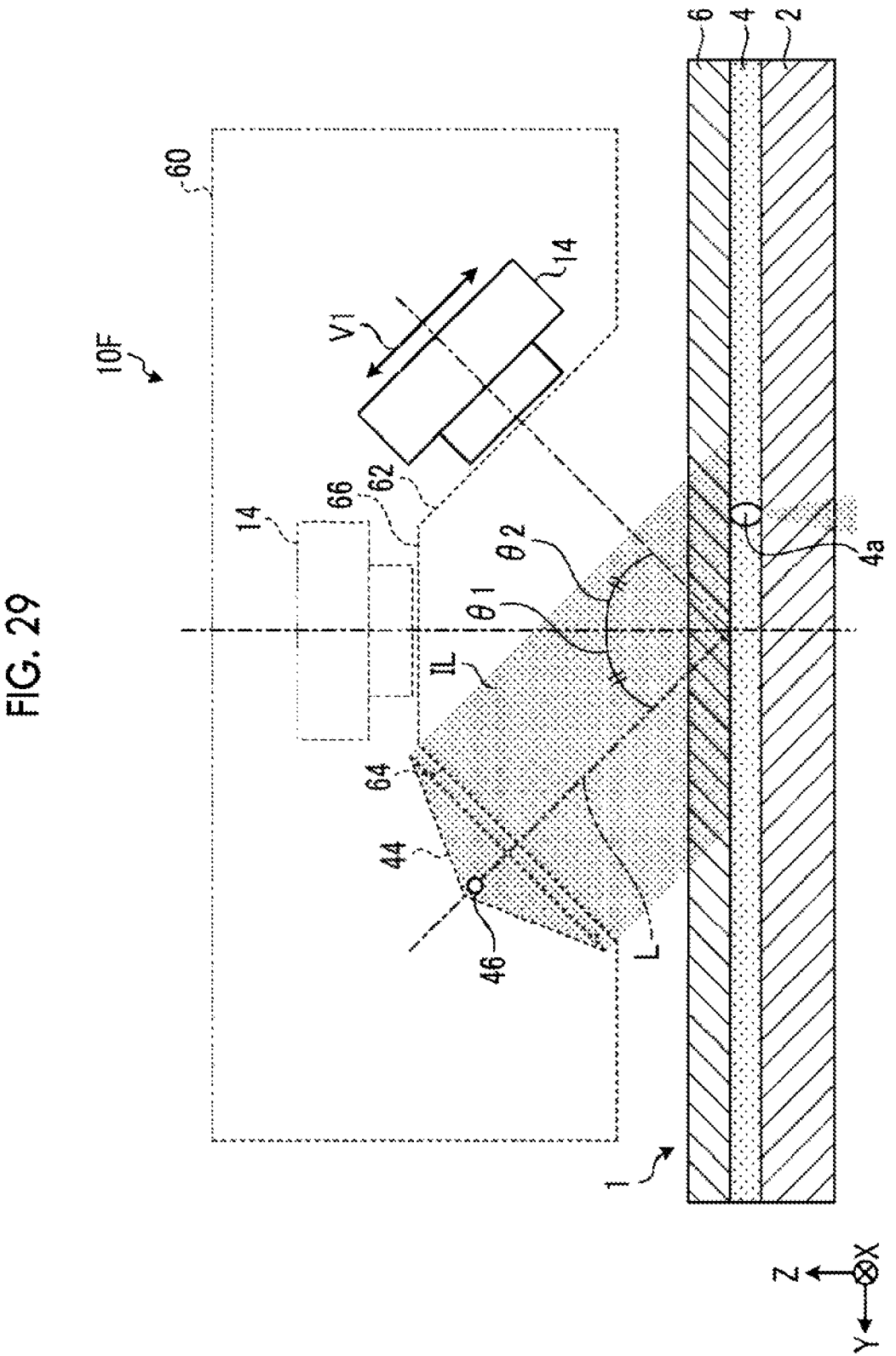
FIG. 29 is a cross-sectional view of an inspection device according to a ninth embodiment.
Figure 30:
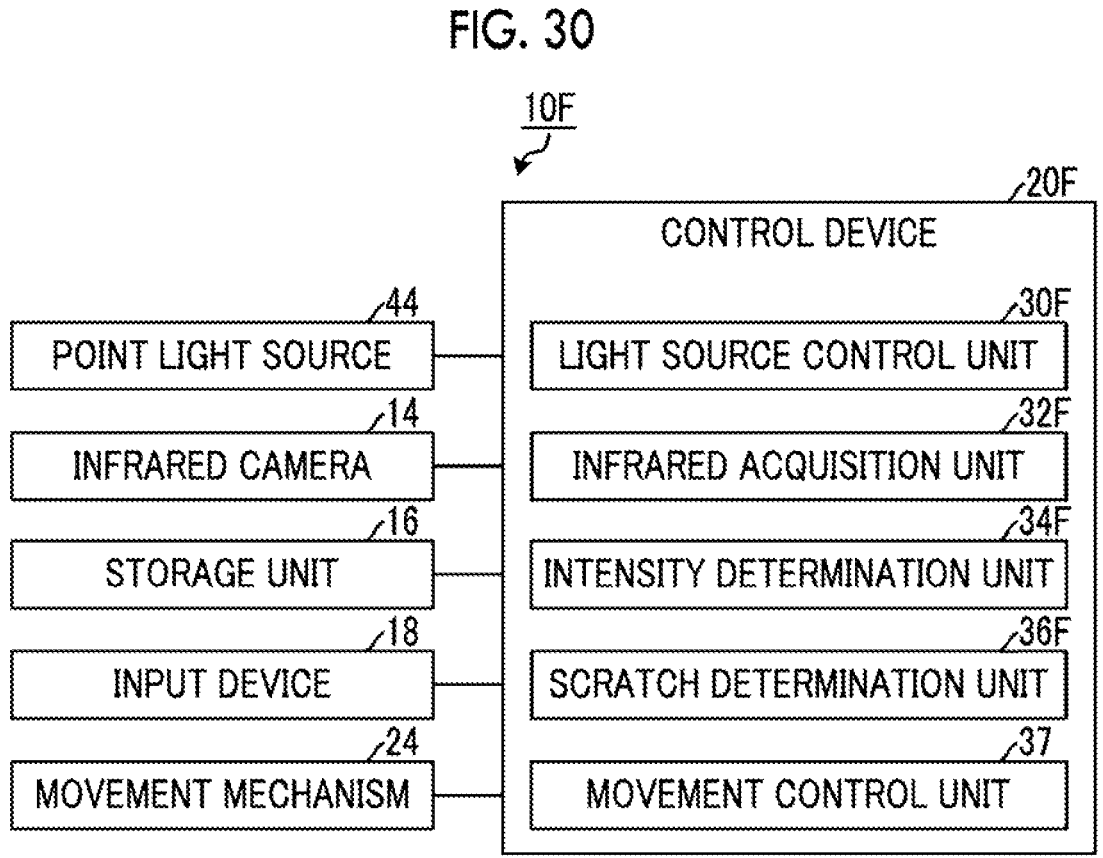
FIG. 30 is a block diagram showing a configuration example of the inspection device according to the ninth embodiment.

A ninth embodiment of the present disclosure will be described. FIG. 29 is a cross-sectional view of an inspection device according to the ninth embodiment. FIG. 29 corresponds to the cross-sectional view taken along line A-A in FIG. 22. FIG. 30 is a block diagram showing a configuration example of the inspection device according to the ninth embodiment. An inspection device 10F is different from the inspection device 10B shown in FIG. 23 in that a movement mechanism 24 and a control device 20F include a movement control unit 37.

The movement mechanism 24 moves the infrared camera 14. For example, the movement mechanism 24 moves the infrared camera 14 from the inclined surface 62 to the horizontal surface 66 along the inclined surface 62 and the horizontal surface 66. For example, the movement mechanism 24 moves the infrared camera from the inclined surface 62 to the inclined surface 64 along the inclined surface 62, horizontal surface 66, and the inclined surface 64.

The movement control unit 37 controls the movement mechanism 24. The movement control unit 37 controls the movement mechanism 24 to move the infrared camera 14.

[Processing Contents]

Figure 31:
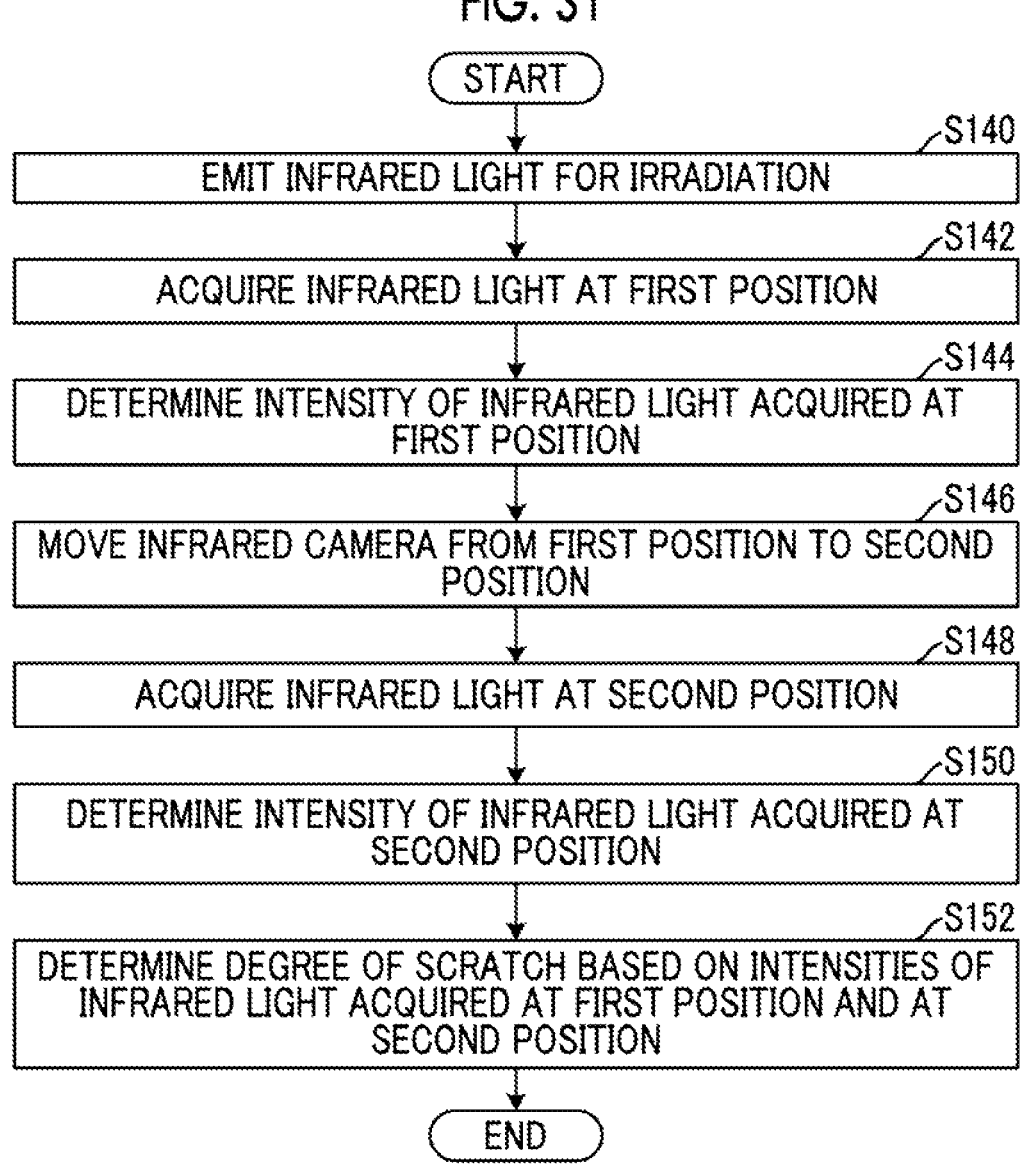
FIG. 31 is a flowchart showing one example of a processing flow of the inspection device according to the ninth embodiment.

Processing contents of the inspection device according to the ninth embodiment will be described with reference to FIG. 31. FIG. 31 is a flowchart showing one example of a processing flow of the inspection device according to the ninth embodiment.

A light source control unit 30F controls the infrared light source 12 to irradiate the inspection target 1 with the infrared light (step S140). Then, the process proceeds to step S142.

An infrared acquisition unit 32F controls the infrared camera 14 at a first position to detect the infrared light reflected by the inspection target 1, and acquires the detected infrared light from the infrared camera 14 (step S142). The infrared light detected at the first position may be referred to as first infrared light. A position on the inclined surface 62 is provided as an example of the first position, but the first position is not limited thereto. Then, the process proceeds to step S144.

An intensity determination unit 34F determines the intensity of the infrared light acquired by the infrared acquisition unit 32F from the infrared camera 14 at the first position (step S144). Then, the process proceeds to step S146.

The movement control unit 37 controls the movement mechanism 24 to move the infrared camera 14 from the first position to a second position (step S146). A position on the horizontal surface 66 is provided as an example of the second position, but the second position is not limited thereto. For example, the movement control unit 37 controls the movement mechanism 24 to move the infrared camera 14 from on the inclined surface 62 onto the horizontal surface 66. Then, the process proceeds to step S148.

The infrared acquisition unit 32F controls the infrared camera 14 at the second position to detect the infrared light reflected by the inspection target 1, and acquires the detected infrared light from the infrared camera 14 (step S148). The infrared light detected at the second position may be referred to as second infrared light. Then, the process proceeds to step S150.

The intensity determination unit 34F determines the intensity of the infrared light acquired by the infrared acquisition unit 32F from the infrared camera 14 at the second position (step S150). Then, the process proceeds to step S152.

A scratch determination unit 36F determines the degree of the scratch 4a based on the intensities of the infrared light acquired from the infrared camera 14 at the first position and at the second position (step S152). For example, the scratch determination unit 36F determines the degree of the scratch 4a based on the intensity of the infrared light acquired at the first position and on the intensity of the infrared light acquired at the second position. For example, the scratch determination unit 36F may perform background correction by subtracting the detection result at the second position from the detection result at the first position, and may determine the degree of the scratch 4a based on the result of the background correction. For example, the scratch determination unit 36F may determine the degree of the scratch 4a based on an AND condition between the intensity of the infrared light acquired at the first position and the intensity of the infrared light acquired at the second position. For example, the scratch determination unit 36F determines the degree of the scratch 4a based on a correlation between the intensity of the infrared light acquired at the first position and the intensity of the infrared light acquired at the second position. Then, the processing in FIG. 31 is terminated.

As described above, in the ninth embodiment, the degree of a scratch in the inspection target is determined based on the detection results at the first position and at the second position different from the first position. Accordingly, in the ninth embodiment, the degree of a scratch can be more accurately determined.

In the ninth embodiment, the degree of a scratch in the inspection target has been described as being determined based on the detection results of the infrared light at two points, the first position and the second position; however, the present disclosure is not limited thereto. In the present disclosure, the degree of a scratch in the inspection target may be determined based on detection results of the infrared light at three or more points at different positions.

Other Embodiments

In each of the above-described embodiments, the inspection target has been described as being a cabin window of an aircraft or the like; however, the present disclosure is not limited thereto. The present disclosure can be applied to, for example, an inspection for a scratch on a metal member of a ship, a bridge, or the like, the metal member being coated with a coating film.

For example, it is assumed that there is no scratch on the coating film on the surface of the metal member but there is a scratch on the metal member under the coating film caused by deterioration or the like. In such a case, the degree of the scratch on the metal member can be determined using the inspection device of the present disclosure. In this case, the wavelength of infrared light used for inspection may be a wavelength that transmits through the coating film but does not transmit through the metal member.

In addition, in each of the above-described embodiments, the light source that emits the infrared light for irradiation has been described as being a point light source; however, the present disclosure is not limited thereto. The light source that emits infrared light for irradiation may be a line light source. In this case, for example, the infrared light source may be configured as a combination of a cylindrical lens and the linear light source that emits infrared light for irradiation.

Effects

The inspection devices and the inspection methods described in the embodiments are understood, for example, as follows.

An inspection device according to a first aspect includes: an infrared acquisition unit 32 that acquires infrared light detected by an infrared camera 14 that detects the infrared light from an inspection target including a conductive member; an intensity determination unit 34 that determines a detection intensity of the infrared light; and a scratch determination unit 36 that determines a presence or absence of a scratch on the conductive member based on the detection intensity of the infrared light.

The inspection device according to the first aspect can easily determine the presence or absence of the scratch on the conductive member included in the inspection target, by irradiating the inspection target with the infrared light.

In the inspection device according to a second aspect, the scratch determination unit 36 determines a degree of the scratch on the conductive member based on the detection intensity of the infrared light and a reference value for determining a presence or absence of the scratch in the inspection target. Accordingly, the degree of the scratch generated on the conductive member can be easily determined based on the reference value prepared in advance.

In the inspection device according a third aspect, an infrared light source 12 is disposed to face the infrared camera 14 with the inspection target interposed between the infrared camera 14 and the infrared light source 12. The infrared camera 14 detects the infrared light with which one surface of the inspection target is irradiated by the infrared light source and which transmits through the other surface. Accordingly, the infrared light source 12 and the infrared camera 14 are disposed with the inspection target interposed between, so that the presence or absence of the scratch on the conductive member can be easily determined according to whether or not the infrared light has transmitted through the inspection target.

In the inspection device according to a fourth aspect, a heating device 22 is disposed to face the infrared camera 14 with the inspection target interposed between the infrared camera 14 and the heating device 22. The infrared camera 14 detects the infrared light emitted by the inspection target heated by the heating device. Accordingly, the heating device 22 and the infrared camera 14 are disposed with the inspection target interposed therebetween, so that the presence or absence of the scratch on the conductive member can be easily determined.

In the inspection device according to a fifth aspect, an infrared light source 12 and a mirror 40 are disposed to face the infrared camera 14 with the inspection target between the infrared camera 14 and both the infrared light source 12 and the mirror 40. The infrared camera 14 detects the infrared light with which the mirror 40 is irradiated by the infrared light source 12, which is reflected to one surface of the inspection target by the mirror 40, and which transmits through the other surface. Accordingly, an optical axis of the infrared camera 14 and a direction in which the infrared light is reflected by the mirror 40 can be easily set to coincide with each other, so that the detection accuracy can be improved.

In the inspection device according to a sixth aspect, when the infrared light is not detected, the scratch determination unit 36 determines that there is no scratch on the conductive member, and when the infrared light is detected, the scratch determination unit 36 determines that there is a scratch on the conductive member. Accordingly, the presence or absence of the scratch on the conductive member can be easily determined by determining the presence or absence of the detection of the infrared light.

In the inspection device according to a seventh aspect, when the detection intensity of the infrared light is zero or equal to or less than a threshold value level set in advance, the scratch determination unit 36 determines that there is no scratch on the conductive member. Accordingly, the presence or absence of the scratch on the conductive member can be more accurately determined by determining the detection intensity of the infrared light.

In the inspection device according to an eighth aspect, an infrared light source 12 is disposed on the same side as the infrared camera 14 with respect to the inspection target. The infrared camera 14 detects the infrared light with which one surface of the inspection target is irradiated by the infrared light source 12 and which is reflected by the one surface of the inspection target. Accordingly, the infrared light source 12 and the infrared camera 14 are disposed side by side to face the inspection target, so that the presence or absence of the scratch on the conductive member can be easily determined according to whether or not the infrared light is reflected by the inspection target.

In the inspection device according to a ninth aspect, an infrared light source 12 and a mirror 40 are disposed on the same side as the infrared camera 14 with respect to the inspection target. The infrared camera 14 detects the infrared light with which the mirror is irradiated by the infrared light source 12, which is reflected to one surface of the inspection target by the mirror 40, and which is reflected by the one surface of the inspection target. Accordingly, by adjusting reflected light of the mirror 40, the optical axis of the infrared camera 14 and a direction of the reflected light of the infrared light from the top coat can be easily set to coincide with each other, so that the detection accuracy can be improved.

In the inspection device according to a tenth aspect, when the infrared light is detected, the scratch determination unit 36 determines that there is a scratch on the conductive member, and when the infrared light is not detected, the scratch determination unit 36 determines that there is no scratch on the conductive member. Accordingly, the presence or absence of the scratch on the conductive member can be easily determined by determining the presence or absence of the detection of the infrared light.

In the inspection device according to an eleventh aspect, when the detection intensity of the infrared light is zero or equal to or less than a threshold value level set in advance, the scratch determination unit 36 determines that there is a scratch on the conductive member. Accordingly, the presence or absence of the scratch on the conductive member can be more accurately determined by determining the detection intensity of the infrared light.

The inspection device according to a twelfth aspect, an infrared light source disposed on the same side as the infrared camera 14 with respect to the inspection target and configured integrally with the infrared camera 14 is provided. The infrared light source is disposed at a position where the infrared light source is allowed to surface-irradiate the inspection target with the infrared light at a predetermined angle. The infrared camera 14 is disposed at a position where an optical axis of the infrared light radiated from the infrared light source and reflected by the inspection target coincides with an optical axis of a lens of the infrared camera 14. Accordingly, the presence or absence of the scratch over a wide range of the inspection target can be inspected at once, and the SN ratio can be improved.

In the inspection device according to a thirteenth aspect, the infrared light source includes a point light source 46 and a parabolic mirror 44, and the parabolic mirror 44 is configured to reflect the infrared light radiated by the point light source 46, and to surface-irradiate the inspection target with the infrared light. Accordingly, the infrared light source capable of inspecting the presence or absence of the scratch over a wide range of the inspection target at once, and improving the SN ratio can be obtained.

In the inspection device according to a fourteenth aspect, the infrared light source includes a point light source 46 and an off-axis parabolic mirror 50, and the off-axis parabolic mirror 50 is configured to reflect the infrared light radiated by the point light source 46, and to surface-irradiate the inspection target with the infrared light. Accordingly, the infrared light source capable of inspecting the presence or absence of the scratch over a wide range of the inspection target at once, and improving the SN ratio can be obtained.

In the inspection device according to a fifteenth aspect, at least one of the infrared camera 14 and the infrared light source includes a filter 48 that selectively transmits the infrared light. Accordingly, infrared light having an undesired wavelength is not incident on the infrared camera 14, so that the SN ratio can be further improved.

In the inspection device according to a sixteenth aspect, the filter 48 is a wavelength-selective filter that selectively transmits the infrared light of a specific wavelength. Accordingly, the configuration that blocks the incidence of infrared light having an undesired wavelength to the infrared camera 14 can be obtained.

In the inspection device according to a seventeenth aspect, the filter 48 is a polarizing filter. Accordingly, the SN ratio is improved when a direction of an opening portion of the scratch and a direction of a polarizing surface are set to coincide with each other, so that the capability of detecting the scratch can be improved.

The inspection device according to an eighteenth aspect, a rotation mechanism that rotates a polarizing surface of the polarizing filter is provided. Accordingly, the time taken to detect the scratch can be shortened by performing inspection while rotating the polarizing surface of the polarizing filter.

The inspection device according to a nineteenth aspect, another infrared camera 14b disposed at a position different from the position of the infrared camera 14a is provided. The infrared acquisition unit 32E acquires another infrared light detected by the other infrared camera 14b. The intensity determination unit 34E determines a detection intensity of the other infrared light. The scratch determination unit 36E determines a presence or absence of the scratch on the conductive member based on the detection intensity of the infrared light and the detection intensity of the other infrared light. Accordingly, the degree of the scratch in the inspection target is determined based on the detection results by two cameras disposed at different positions, so that the degree of the scratch can be more accurately determined.

The inspection device according to a twentieth aspect, a movement mechanism 24 that moves the infrared camera 14 between a first position and a second position different from the first position is provided. The infrared camera 14 detects first infrared light from the inspection target at the first position, and second infrared light from the inspection target at the second position. The infrared acquisition unit 32F detects the first infrared light and the second infrared light. The intensity determination unit 34F determines detection intensities of the first infrared light and the second infrared light. The scratch determination unit 36F determines a presence or absence of the scratch on the conductive member based on the detection intensity of the first infrared light and the detection intensity of the second infrared light. Accordingly, the degree of the scratch in the inspection target is determined based on the detection results at the different positions, so that the degree of the scratch can be more accurately determined.

An inspection method according to a 21st aspect includes: a step of acquiring infrared light detected by an infrared camera that detects the infrared light from an inspection target including a conductive member; a step of determining a detection intensity of the infrared light; and a step of determining a presence or absence of a scratch on the conductive member based on the detection intensity of the infrared light. Accordingly, the presence or absence of the scratch on the conductive member included in the inspection target can be determined by irradiating the inspection target with the infrared light.

The embodiments of the present disclosure have been described above; however, the present disclosure is not limited by the contents of the embodiments. In addition, the above-described components include those that can be easily assumed by those skilled in the art, those that are substantially the same, and those that are within a so-called equivalent range. Further, the above-described components can be combined as appropriate. Further, the above-described components can be variously omitted, replaced, and modified without departing from the concept of the above-described embodiments.

REFERENCE SIGNS LIST

1 Inspection target
2 Base material
4 Conductive film
6 Top coat
10, 10A, 10B, 10C, 10D, 10E, 10F Inspection device
12 Infrared light source
14 Infrared camera
14a First infrared camera
14b Second infrared camera
16 Storage unit
18 Input device
20, 20A, 20E, 20F Control device
22 Heating device
24 Movement mechanism
30, 30E, 30F Light source control unit
32, 32E, 32F Infrared acquisition unit
34, 34E, 34F Intensity determination unit
36, 36E, 36F Scratch determination unit
37 Movement control unit
38 Heating control unit
40 Mirror
42 Half mirror
44 Parabolic mirror
46 Point light source
48 Filter
50 Off-axis parabolic mirror
60 Housing
62, 64 Inclined surface
66 Horizontal plane

The invention claimed is:

1. An inspection device comprising:
an infrared acquisition unit configured to acquire an intensity of infrared light detected by an infrared camera configured to detect the infrared light from an inspection target including a conductive member;
an intensity determination unit configured to determine a detection intensity of the infrared light; and
a scratch determination unit configured to determine a presence or an absence of a scratch on the conductive member based on the detection intensity of the infrared light;
wherein:
a wavelength of the infrared light is a wavelength that passes through the inspection target and a top coat on the inspection target, but does not pass through the conductive member; and the infrared acquisition unit is configured to change a detection sensitivity of the infrared camera according to a distance between the inspection target and the infrared camera.

2. The inspection device according to claim 1, wherein the scratch determination unit is configured to determine a degree of the scratch on the conductive member based on the detection intensity of the infrared light and a reference value for determining the presence or the absence of the scratch on the inspection target.

3. The inspection device according to claim 1, further comprising:

an infrared light source configured to face the infrared camera with the inspection target interposed between the infrared camera and the infrared light source, wherein the infrared camera is configured to detect the infrared light with which a first surface of the inspection target is irradiated by the infrared light source and which transmits through a second surface of the inspection target.

4. The inspection device according to claim 1, further comprising:

a heating device configured to face the infrared camera with the inspection target interposed between the infrared camera and the heating device, wherein the infrared camera is configured to detect and the infrared light emitted by the inspection target and heated by the heating device.

5. The inspection device according to claim 1, further comprising:

an infrared light source and a mirror configured to face the infrared camera with the inspection target between the infrared camera and both the infrared light source and the mirror, wherein the infrared camera is configured to detect the infrared light with which the mirror is irradiated by the infrared light source, which is reflected to a first surface of the inspection target by the mirror, and which transmits through a second surface of the inspection target.

6. The inspection device according to claim 3, wherein the scratch determination unit is configured to determine that:

there is no scratch on the conductive member when the infrared light is not detected; and there is the scratch on the conductive member when the infrared light is detected.

7. The inspection device according to claim 6, wherein the scratch determination unit is configured to determine that there is no scratch on the conductive member when the detection intensity of the infrared light is zero or equal to or less than a threshold value.

8. The inspection device according to claim 1, further comprising:

an infrared light source configured to be on as same side as the infrared camera with respect to the inspection target, wherein the infrared camera is configured to detect the infrared light with which one surface of the inspection target is irradiated by the infrared light source and which is reflected by the one surface of the inspection target.

9. The inspection device according to claim 1, further comprising:

an infrared light source and a mirror are configured to be on a same side as the infrared camera with respect to the inspection target, wherein the infrared camera is configured to detect the infrared light with which the mirror is irradiated by the infrared light source, which is reflected to one surface of the inspection target by the mirror, and which is reflected by the one surface of the inspection target.

10. The inspection device according to claim 8, wherein the scratch determination unit is configured to determine that:

there is the scratch on the conductive member when the infrared light is not detected; and there is no scratch on the conductive member when the infrared light is detected.

11. The inspection device according to claim 10, wherein the scratch determination unit is configured to determine that there is the scratch on the conductive member when the detection intensity of the infrared light is zero or equal to or less than a threshold value.

12. The inspection device according to claim 1, further comprising:

an infrared light source which is integral with the infrared camera and configured to be on a same side as the infrared camera with respect to the inspection target, wherein:

the infrared light source is at a position where the infrared light source is configured to surface-irradiate the inspection target with the infrared light at an angle; and the infrared camera is at a position where an optical axis of the infrared light radiated from the infrared light source and reflected by the inspection target coincides with an optical axis of a lens of the infrared camera.

13. The inspection device according to claim 12, wherein:

the infrared light source includes a point light source and a parabolic mirror; and the parabolic mirror is configured to reflect the infrared light radiated by the point light source, and surface-irradiate the inspection target with the infrared light.

14. The inspection device according to claim 12, wherein:

the infrared light source includes a point light source and an off-axis parabolic mirror; and the off-axis parabolic mirror is configured to reflect the infrared light radiated by the point light source, and surface-irradiate the inspection target with the infrared light.

15. The inspection device according to claim 12, wherein at least one of the infrared camera or the infrared light source includes a filter configured to selectively transmit the infrared light.

16. The inspection device according to claim 15, wherein the filter is a wavelength-selective filter.

17. The inspection device according to claim 15, wherein the filter is a polarizing filter.

18. The inspection device according to claim 17, further comprising:

a rotation mechanism configured to rotate a polarizing surface of the polarizing filter.

19. The inspection device according to claim 12, wherein:

the infrared camera is a first infrared camera, the infrared light is first infrared light, and the position of the first infrared camera is a first position;

the inspection device further comprises a second infrared camera at a second position different from the first position;

the infrared acquisition unit is configured to acquire an intensity of second infrared light detected by the second infrared camera;

the intensity determination unit is configured to determine a detection intensity of the second infrared light, and the scratch determination unit is configured to determine the presence or the absence of the scratch on the conductive member based on the detection intensity of the first infrared light and the detection intensity of the second infrared light.

20. The inspection device according to claim 12, further comprising:

a movement mechanism configured to move the infrared camera between a first position and a second position different from the first position, wherein:

the infrared camera is configured to detect first infrared light from the inspection target at the first position, and second infrared light from the inspection target at the second position;

the infrared acquisition unit is configured to acquire the first infrared light and the second infrared light;

the intensity determination unit is configured to determine the detection intensity of the first infrared light and the detection intensity of the second infrared light; and the scratch determination unit is configured to determine the presence or the absence of the scratch on the conductive member based on the detection intensity of the first infrared light and the detection intensity of the second infrared light.

21. An inspection method comprising:

acquiring an intensity of infrared light detected by an infrared camera that detects the infrared light from an inspection target including a conductive member;

determining a detection intensity of the infrared light;

determining a presence or an absence of a scratch on the conductive member based on the detection intensity of the infrared light; and changing a detection sensitivity of the infrared camera according to a distance between the inspection target and the infrared camera, wherein a wavelength of the infrared light is a wavelength that passes through the inspection target and a top coat on the inspection target, but does not pass through the conductive member.

22. The inspection device according to claim 4, wherein the scratch determination unit is configured to determine that:

there is no scratch on the conductive member when the infrared light is not detected; and there is the scratch on the conductive member when the infrared light is detected.

23. The inspection device according to claim 5, wherein the scratch determination unit is configured to determine that:

there is no scratch on the conductive member when the infrared light is not detected; and there is the scratch on the conductive member when the infrared light is detected.

24. The inspection device according to claim 9, wherein the scratch determination unit is configured to determine that:

there is no scratch on the conductive member when the infrared light is detected; and there is the scratch on the conductive member when the infrared light is not detected.

* * * * *